United States Patent [19]
Buzzeo et al.

[11] Patent Number: 6,125,363
[45] Date of Patent: Sep. 26, 2000

[54] DISTRIBUTED, MULTI-USER, MULTI-THREADED APPLICATION DEVELOPMENT METHOD

[76] Inventors: Eugene Buzzeo; Stan Campbell, both of 4041 N. Central Ave., Suite 1050, Phoenix, Ariz. 85012

[21] Appl. No.: 09/050,545

[22] Filed: Mar. 30, 1998

[51] Int. Cl.[7] .................................................. G06F 17/00
[52] U.S. Cl. .............................. 707/100; 707/4; 707/100; 707/103; 707/501
[58] Field of Search .................................. 707/1, 10, 103, 707/4, 100, 501, 513; 705/26–28; 709/201, 206; 713/201

[56] References Cited

U.S. PATENT DOCUMENTS

| | | | |
|---|---|---|---|
| 4,868,866 | 9/1989 | Williams. Jr. .............................. | 380/49 |
| 5,179,660 | 1/1993 | Devany et al. .......................... | 395/200 |
| 5,457,797 | 10/1995 | Butterworth et al. ................... | 395/650 |
| 5,768,510 | 6/1998 | Gish .................................... | 395/200.33 |
| 5,790,789 | 8/1998 | Suarez ................................. | 392/200.32 |
| 5,812,529 | 9/1998 | Czarnik et al. .......................... | 370/245 |
| 5,848,246 | 12/1998 | Gish .................................... | 395/200.58 |
| 5,860,068 | 1/1999 | Cook ......................................... | 705/26 |
| 5,899,990 | 5/1999 | Maritzen et al. ........................... | 707/4 |
| 5,931,900 | 8/1999 | Notani et al. ............................. | 709/201 |
| 5,933,830 | 8/1999 | Williams ................................. | 707/100 |
| 5,948,040 | 9/1999 | DeLorme et al. ....................... | 701/201 |
| 5,953,005 | 9/1999 | Liu ......................................... | 707/501 |
| 5,987,454 | 11/1999 | Hobbs ........................................ | 707/4 |

OTHER PUBLICATIONS

IONA Technologies: IONA announces availability of Orbix-OTM with support from over 200 organizations, M2 Communications Ltd., M2 Presswire, Feb. 10, 1998.

Merle, Philippe et al., "CorbaWeb: A generic object navigator", Computer Networks and ISDN Systems, vol.: 28, Issue: 11, May 1996, pp. 1269–1281.

Saleh, Kassem et al., "The distributed object computing paradigm: concepts and applications", Journal of Systems and Software, vol.: 47, Issue: 2–3, Jul. 1, 1999, pp. 125–131.

Wu, Daniel et al., "StartOSphere: Mobile Processing of Distributed Objects in Java", The fourth annual ACM/IEEE international conference on Mobile computing and networking, Oct. 25–30, 1998, pp. 121–132.

Murthy, V. K. et al., "Distributed object models, mobile computing and electronic commerce", Proceedings of the 1998 ICPP Workshops on Architetural and OS Support for Multimedia Applications/Flexible Communication System/Wireless networks and Mobile Compu, Aug. 1998.

*Primary Examiner*—Hosain T. Alam
*Assistant Examiner*—Shahid Alam
*Attorney, Agent, or Firm*—Stephen T. Sullivan

[57] ABSTRACT

An object-oriented multi-threaded application development system and method for developing resource information software is provided, wherein the application development framework is made up of three tiers. The first tier comprises at least one computer running a web browser, where the web browser is capable of running an object-orientated applet. The second tier similarly comprises at least one computer, wherein the computer runs a web server, a report server, and an application server. The first and second tiers are connected through a network. The third tier comprises at least a third computer, wherein the third computer runs an object-orientated database management system. The third computer is connected to the second tier through a second network.

3 Claims, 18 Drawing Sheets

TIER I  TIER II

TIER I    TIER II

TIER I             TIER II

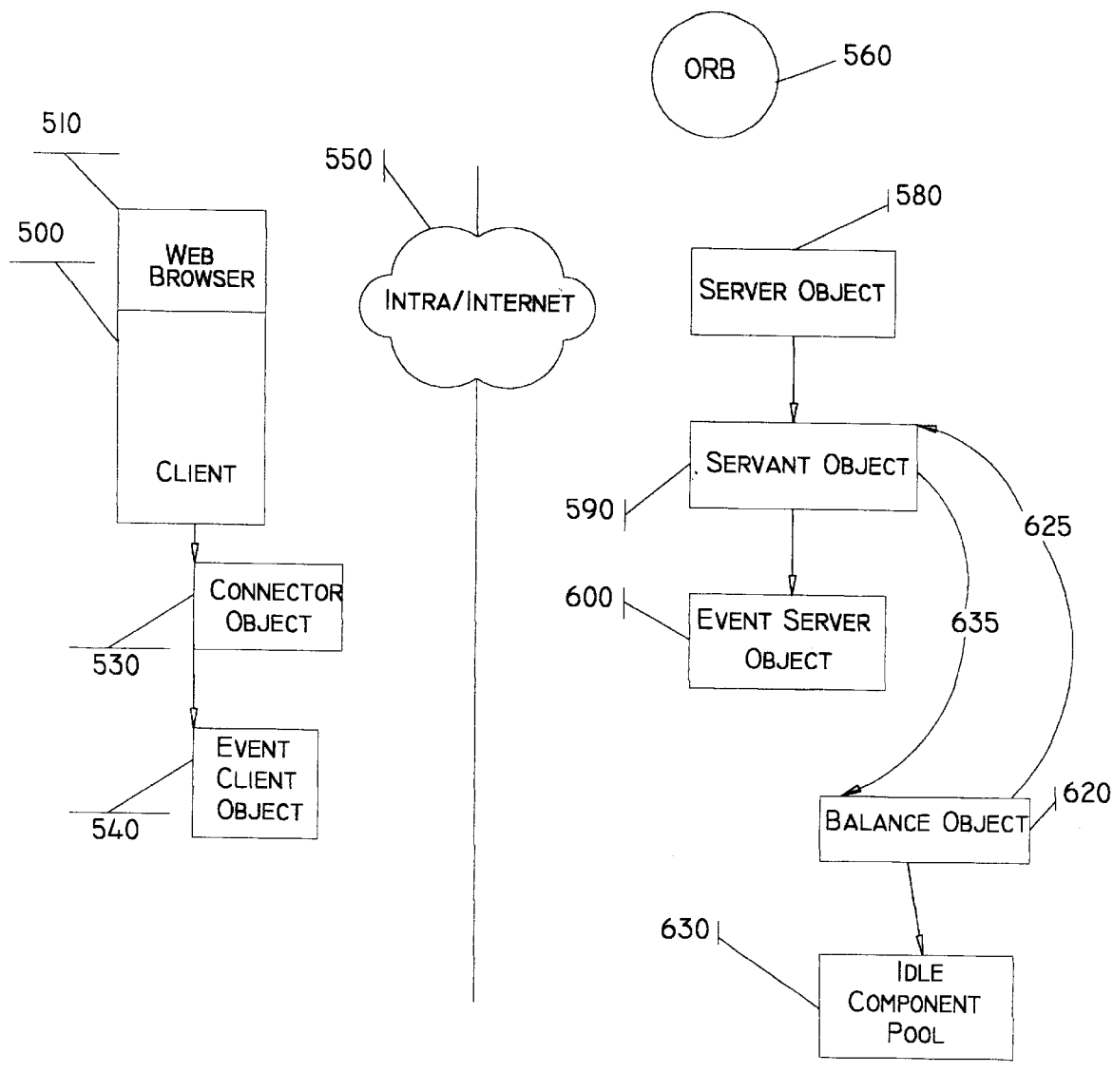

TIER I　　　TIER II

DISTRIBUTED, MULTI-USER, MULTI-THREADED APPLICATION DEVELOPMENT METHOD

BACKGROUND OF THE INVENTION

As network technology becomes progressively more advanced, the demand for software capable of taking full advantage of these network advances correspondingly rises. However, many organizations dependent on information technology are struggling to manage complex heterogeneous environments that incorporate disparate hardware, software, applications, networks, and database systems. Thus, there has been an increasing demand and need for information resource software that is flexible, robust, and easily upgraded and customized. Moreover, it is desirable for these systems to be hardware independent, support multiple users, and based on a distributed architecture. Accordingly, the present invention provides an object-oriented, distributed, multi-user, multi-threaded application development framework for such applications.

There have been many attempts in the prior art to provide such an adequate information system. These systems, however, have been based on proprietary code that is hardware dependent, inflexible, difficult to upgrade, and difficult to maintain. An example of one such prior art system is disclosed in U.S. Pat. No. 4,839,822 which discloses an expert system for use in treating various types of trauma. This prior art expert system is a diagnostic system which is used to recommend a course of treatment based on information input from the user. The system achieves this result primarily through the use of a knowledge base and an inference engine. The software uses the well known Personal Consultant Plus inference engine, along with the Structured Query Language (SQL) database engine and the Essential Graphics software package. Based on the information input from the user, the inference engine receives information from the knowledge base which includes a collection of rules and parameter descriptions, upon which the treatment is suggested.

This prior art system, however, suffers from several shortcomings. Since the software is written in Microsoft C, upgrading or rewriting the code is significantly difficult and time consuming. For example, a rewrite of the code in order to use a different inference engine or a different database server would consume considerable time and effort. Moreover, the portability of the software is very limited. Due to inherent limitations of the C programming language, different versions of the software must be compiled for each different type of client computer used. An additional drawback to this type of software is how the data is stored. The data in a SQL relational database, for example, is stored in tables made up of rows and columns of records. In order to access this data, the methods for accessing it must be coded separately from the data.

Other prior art information systems known to applicants suffer similar drawbacks in that they generally accomplish their goals at the expense of cross platform capability, software maintainability, and cumbersome data retrieval and storage. This is so even though more flexible programming languages, such as Java, by Sun Microsystems, have been developed and even though the use of inference engines has increased. Therefore, it would be desirable to create a more flexible development system and method for use in expert type data processing systems that is more robust, flexible, maintainable, upgradable, and cross-platform capable than currently available in the prior art. Accordingly, applicants have developed an object-oriented, distributed, multi-user, multi-threaded development system and method which overcomes the disadvantages of the prior art.

SUMMARY OF THE INVENTION

A distributed, multi-user, multi-threaded application development system and method is provided in which the system architecture is made up of three tiers. The first tier comprises at least one computer running a conventional web browser, where the web browser is capable of running an object-oriented applet. The second tier similarly comprises at least one computer, wherein the computer runs a conventional web server, a conventional report server, and a conventional application server. The first and second tiers are connected through a network such as in intranet or Internet network. The third tier comprises at least a third computer, wherein the third computer runs an object-oriented database management system, with the third computer being connected to the second tier through a second network such as also an intranet or Internet network. The second tier applications may be abstracted by incorporating an application programming interface. The system and method of the present invention may support a multitude of users, be distributed over a multitude of computers, and be multi-threaded. The web browser running on the user or client computer may be any conventional web browser capable of supporting running a Java applet. The underlying application framework is written in an object-oriented language, such as Java, and is based on a set of hierarchical classes, wherein the classes comprise server components, client components, and an object model.

In employing the system and method of the present invention, the user or client instantiates a session by downloading an HTML page. The applet in the HTML page creates a ZeoConnector, which creates a ZeoEventClient. The ZeoConnector contacts the ORB through the Internet or intranet. The ORB hands the ZeoConnector to the ZeoServer. The ZeoServer creates a ZeoServant to handle all the traffic from the client. The ZeoServant instantiates a ZeoEventServer to handle all the client's requests for services. The client then chooses a service it invokes such as, for example, 'ADMIT A STUDENT", assuming the invention is used by an educational institution for management of its student database. The ZeoConnector contacts the ZeoServant. The ZeoServant requests an idle ComponentPool from ZeoBalance, which balances the workload among several servers. ZeoBalance reports where the idle Component Pool is to ZeoServant. The ZeoServant requests that a specific component be instantiated from Component Pool. The Component Pool then instantiates an instance of the ZeoComponent (e.g., ADMIT STUDENT). The ZeoComponent then obtains a reference to its ZeoEventServer. The ZeoComponent registers with ZeoMonitor through ZeoEventServer's EventQ. The ZeoEventClient tells the ZeoComponent what it wants to do. The ZcoComponent then instantiates the appropriate ZeoObjects to do the requested transaction. The ZeoComponent requests the appropriate GUI screen, which is sent to the ZeoEventClient., The client then inputs the information. The ZeoObjects perform appropriate functions based on the input, such as calling for Rules logic in the inference engine to help accomplish its task. The ZeoComponent then instantiates a ZeoRulesSession and pulls the appropriate rules and the ZeoObject executes the Rules according to its encapsulated functions. The ZeoObject may pull information from the OODBMS through DatabaseService or may store information in the OODBMS through the same DatabaseService class. When the ZeoComponent finishes its transaction, it is time stamped by ZcoEventServer. The ZeoEvent Client on Tier I continues to poll the ZeoEventServer to see if there are any active ZeoComponents in the EventQ. If none, ZeoMonitor is notified and shuts down the components that were activated. Java then cleans up the remaining dead ZeoServant, which is now empty.

BRIEF DESCRIPTION OF THE DRAWINGS

FIG. 5f is a sixth step in the process of the present invention;

FIG. 5i is a ninth step in the process of the present invention;

DETAILED DESCRIPTION OF THE INVENTION

Figure 1:
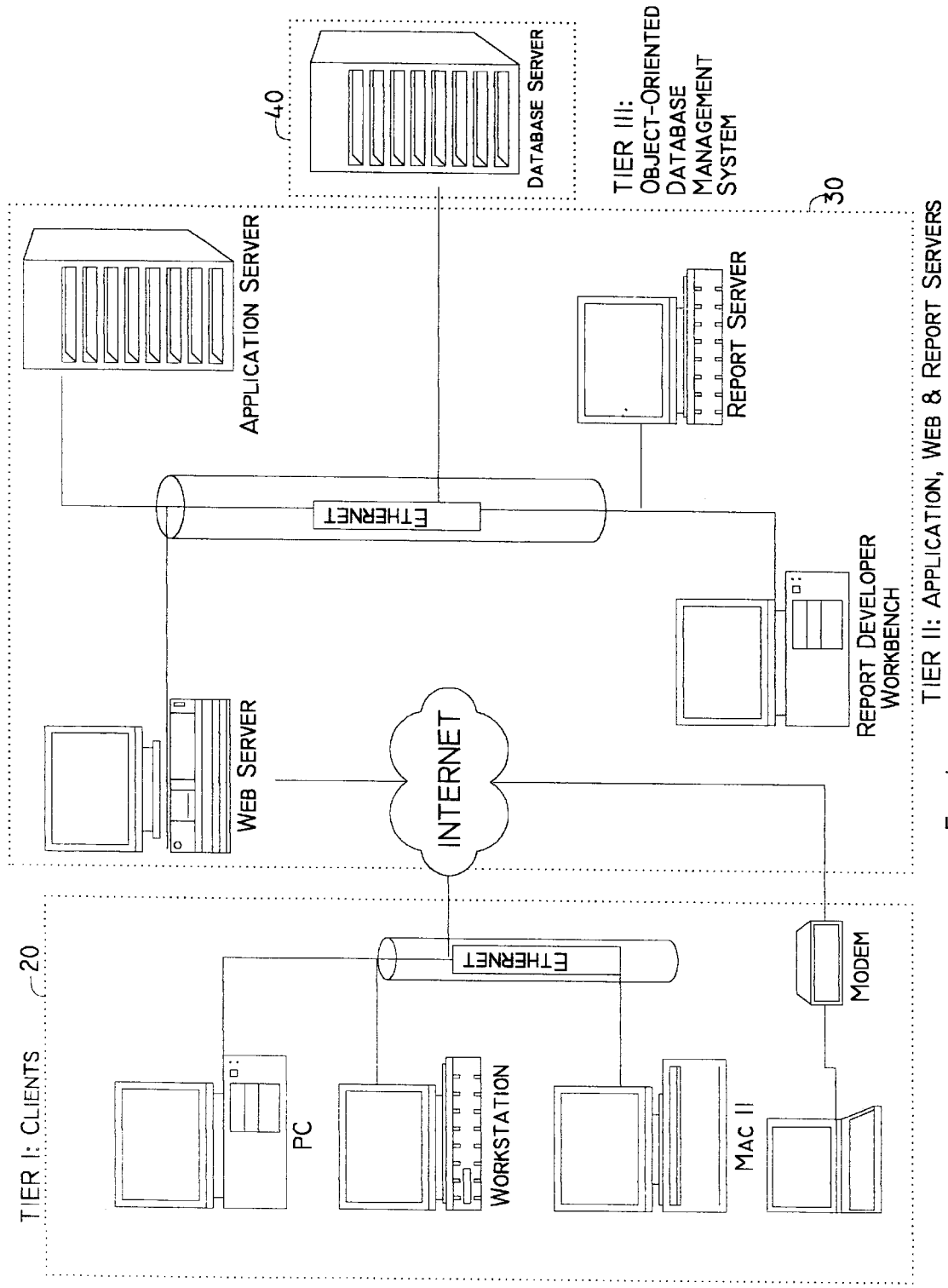
FIG. 1 is a general schematic of the present invention.

Referring now to the drawings in detail, the present invention uses an object-oriented language, such as Java, with distributed network resources using Common Object Request Broker Architecture (CORBA), and the integration of an Object-Oriented Database Management System (OODMS).

As is well known, object-oriented programming, such as Java, employs a programming language that is based on the concept of an object. In order to understand the present invention, a brief review of conventional object-oriented programming may be helpful. In this regard, an object is a data structure that comprises a set of data fields and methods that operate on the data. Objects are structured by class. A class is a group of objects that inherit the same set of attributes. The code underlying the object is essentially invisible to the rest of the program; thus, so long as the interface to an object remains the same, the underlying code of an object may be changed without effecting the rest of the program. For example, a program may use an object called "door", which receives a variable "push", and returns a variable "door open". The code underlying the object "door" may be completely changed without effecting any other portion of the code that uses the object "door", so long as the object still receives and returns the same types of data.

In particular, the well known programming language Java, available from Sun Microsystems, is uniquely suited for an enterprise wide information resource program. Since Java is an object-oriented programming language, it is very easily maintained and upgraded. Moreover, programs written in Java are not complied; rather, they are interpreted by a Java Virtual Machine (JVM). Any computer running a JVM is capable of running a Java Program. Currently, JVMs are part of many popular conventional web browsers, including Netscape Navigator, Microsoft Internet Explorer, and Sun's HotJava. Therefore, virtually any type of computer can run a program written in Java.

As noted above, the development system and method of the present invention preferably employs Common Object Request Broker Architecture (CORBA) which is a conventional open, distributed, object computing infrastructure that is currently being standardized. CORBA allows heterogeneous network clients to communicate with distributed network components. The CORBA specification accomplishes this by defining a software bus called the Object Request Broker (ORB). The ORB provides the infrastructure necessary to enable cross-platform communication among distributed objects and client programs. A CORBA compliant ORB automates many common network programming tasks such as object registration, location, and activation, request demultiplexing, framing and error handling, parameter marshaling and demarshalling, and operation dispatching. One example of such a CORBA compliant ORB is commercially available under the name Visibroker, from Visigenic.

Many conventional information resource software products, such as the prior art system disclosed in U.S. Pat. No. 4,839,822, use relational databases such as the SQL database from Microsoft. Although these databases may be robust and reliable, they are ill-suited for an object-oriented environment such as contemplated by the present invention. A relational database conventionally stores data in a row and column format. Accordingly, when an object sends data to a relational database, the data must be stripped from the object and reassembled in the row and column format so that it may be stored. Similarly, when requesting data from a relational database, the row and column data must be transformed into an object that the requesting program can understand.

This problem is not present in the present invention which employs an object-oriented database and an object-oriented database management system (OODMS). Unlike the relational database employed in the prior art, the object-oriented database or OODMS stores data as objects. Therefore, the database in the present invention can receive and store data as an object in exactly the same form that the object-oriented program uses them. Similarly, data can be retrieved from the database of the present invention in exactly the same object that the program requests it in.

Figure 6:
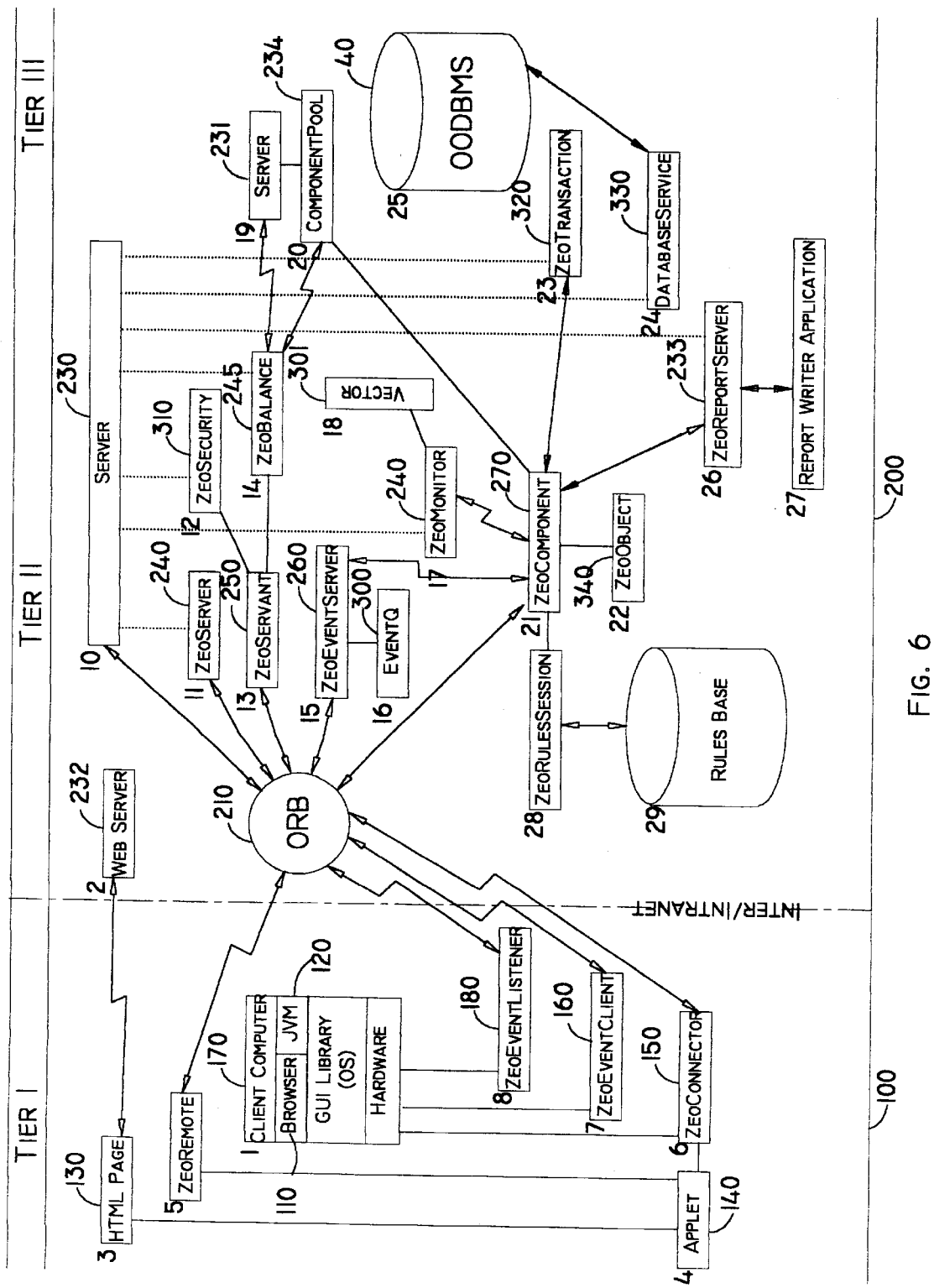
FIG. 6 is a diagramattical illustration, similar to FIG. 1, illustrating all three tiers of the present invention in detail.

Referring now to FIGS. 1 and 6, the object-oriented, distributed, multi-user, multi-threaded application development system in accordance with the present invention is shown. As shown and preferred, the present invention system architecture consists of a set of classes, which are hierarchical in nature and consist of server components, client components, and an object model. The present invention allows information systems, or daughter applications, that are similarly distributed, object-oriented, multi-user and multi-threaded to be built on top of the framework of the system architecture. In the preferred embodiment of the invention, the system development architecture is organized into three Tiers, Tiers I, II and III. Generally, Tier I (20) comprises user or client CPU's running conventional web browsers with compliant conventional JVM's. Tier II (30) comprises at least one computer system with a conventional web server, application server, and report server. Tier III (40) comprises a computer system in which a conventional Object-Oriented Database Management System (OODBMS) has been installed. In the presently preferred embodiment of the present invention, the system development architecture is written entirely in the well known Java programming language and is run on any conventional computers capable of running Java. While other computer programming languages could be used for Tiers II and III if desired, Java allows for the best integration between all three tiers. The present invention preferably uses conventional pluggable computer components that can be switched easily without substantially rewriting the system's code. This is accomplished by using conventional, commercially available program components for the underlying infrastructure, and subsequently building abstraction layers on top of them. The abstraction layer of the present invention may be, for example, an application programming interface (API). Accordingly, since daughter applications are preferably written on top of the API, so long as the calls to the API remain the same, the underlying third party products may be changed with minimal changes to the code of the system architecture. These pluggable components preferably consist of a report writer and server, an Object Request Broker (ORB), an inference engine, and the OODBMS. Although the present invention is flexible enough to employ any type of third party software, an illustrative example of a report server which provides preferred results is Actuate Report Server 3.0 commercially available from Actuate. Similarly, an example of a presently preferred ORB is Visibroker, commercially available from Visigenic. An example of a presently preferred conventional inference engine employed in the present invention is Advisor/J2.0 commercially available from Neuron Data. The OODBMS may preferably be, for example, the object database commercially available from Versant Object Technology.

Figure 2A:
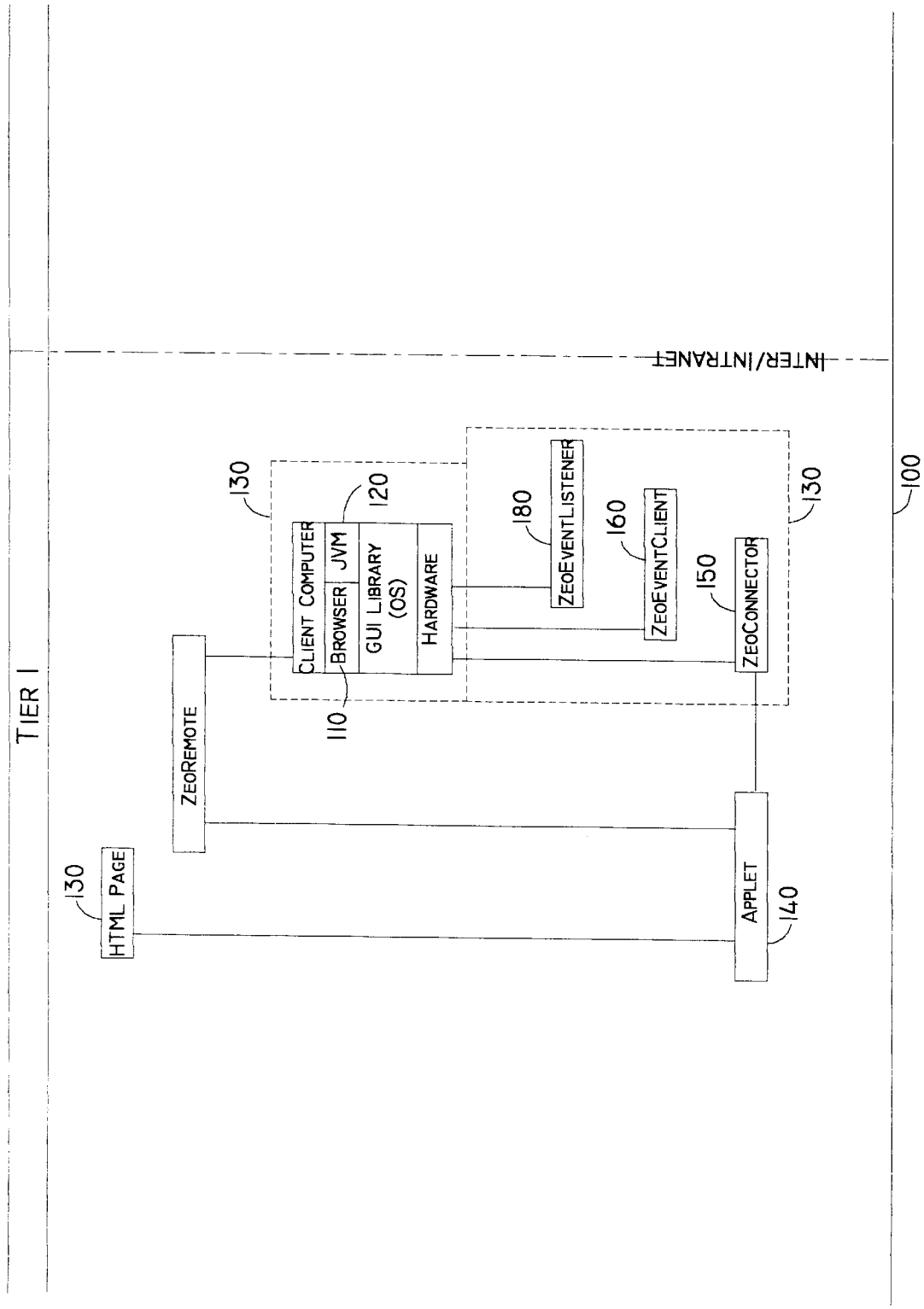
FIG. 2a is a detailed schematic of the components of Tier I of the present invention.

The tiers employed in the present invention shall now be described separately in greater detail, starting with Tier I illustrated in FIG. 2a which shows the structural components of Tier I 100. Tier I generally comprises a conventional client computer 170, client objects 180, HTML page 130 and applet 140. The client computer 170 runs a conventional web browser 110. The client computer 170 may be virtually any type of conventional computer, so long as it is connected to the Internet/intranet in some way. For example, as shown in FIG. 1, the client computer may be a conventional IBM PC, a workstation, a Macintosh, a laptop, or any combination of different computer types. The conventional web browser 110 is preferably capable of running a conventional Java Virtual Machine (JVM) 120. Examples of such conventional web browsers are Microsoft's Internet Explorer, Netscape's Navigator, or Sun's HotJava.

Figure 2B:
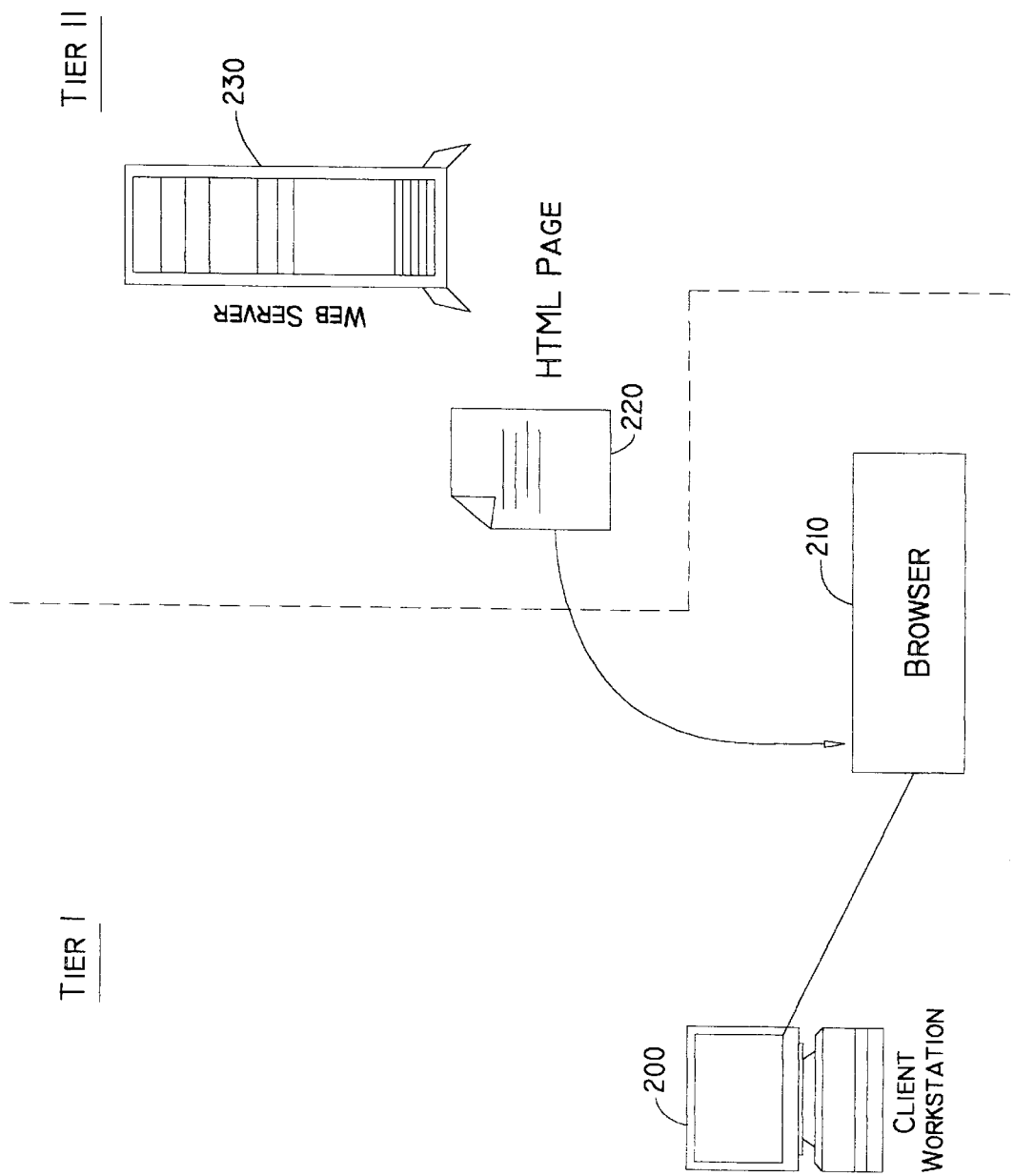
FIG. 2b is a schematic of a communication between Tier I and Tier II of the present invention.

As shown and preferred in FIG. 2b, the client workstation 200 contacts a conventional web server 230 which is part of Tier II to be discussed below. The web server 230 preferably sends the conventional web browser 210 an HTML page 220, which preferably has a Java applet embedded within it. As shown and preferred in FIG. 2a, the applet 140 spawns a Connector Object 150, which is defined by a Connector class contained within the applet 130. The Connector Object then creates a Event Client Object 190. The Event Client Object 160 preferably handles service requests, and allows the client 170 to access any services or data. Moreover, when the Event Client Object 160 is created, it preferably creates an Event Listener Object 180. The Event Object 180 connects to the ORB 210 independently of the Connector Object 150.

Referring now to Tier II of the present invention, Tier II preferably comprises at least one conventional computer system with a conventional web server, application server, and a report server. As shown in FIGS. 1 and 6, Tier II may be distributed; that is, there may be many servers in Tier II. However, if desired, Tier II may also be implemented with only one server. The use of multiple servers maximizes computing power, speed, and efficiency. Moreover, in a distributed environment, the servers may be load balanced so that the workload may be automatically balanced by spreading requests to idle machines. Additionally, Tier II preferably provides multi-user and multi-threaded support in accordance with the present invention. Any number of users or clients from Tier I can exist simultaneously, so long as the hardware can support it. Similarly, each client can be using Tier II resources at the same time, as each client has its own thread, from which there are sub-threads for each transaction conducted.

Figure 3:
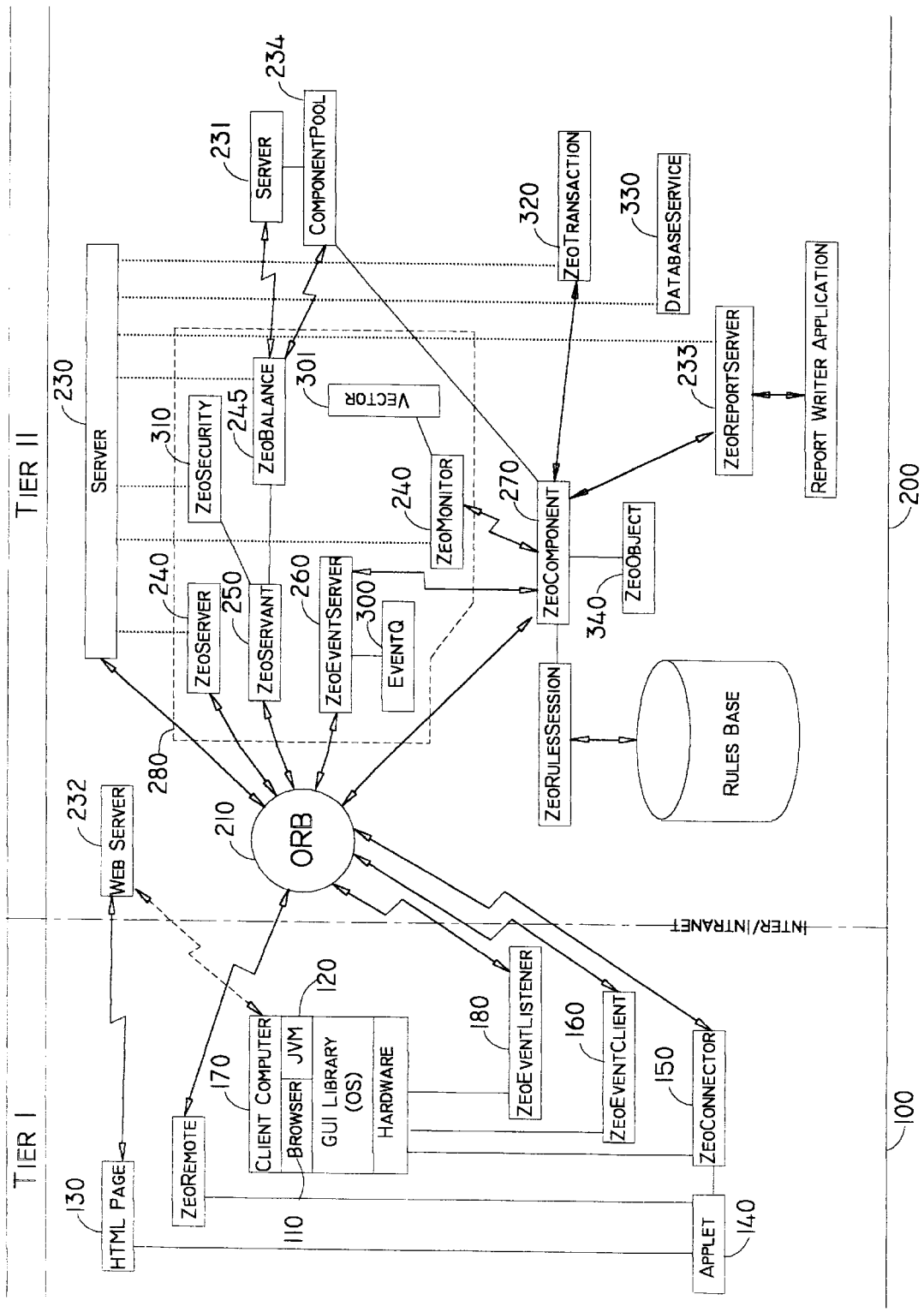
FIG. 3 is a detailed schematic of Tier I and Tier II.

Referring now to FIGS. 3 and 6, as shown and preferred, Tier II generally comprises a plurality of applications servers 230, 231, a web server 232, a report server 233, and an Object Request Broker (ORB) 210. The applications servers 230,231 further comprise a plurality of server classes 280, and a component pool 234. Each server preferably comprises all of these aforementioned elements; however, server 231 is shown, by way of example, with only a component pool 234 for clarity.

The application servers 230, 231, web server 232, and report server 233 may or may not be distributed among computer systems connected by an intra/Internet, as desired, in accordance with the present invention. For example, the web server 232 and application servers 230, 231 may reside on one machine, while the report server 233 resides on another machine in a different location. Similarly, although two application servers 230 231 are shown, this is for illustrative purposes only. The application server may actually reside on one machine, or be distributed among several depending on the needs and desires of the users of the system of the present invention.

The ORB 210 may be any conventional ORB that is CORBA compliant. For example, as previously mentioned, Visibroker from Visigenic may be employed. The ORB 210 is the gateway through which communication takes place between the user and the system. Tier I contacts the ORB 210 through an intranet or over the Internet 220. The ORB 210 directs traffic for all clients to the appropriate place to find what each client is requesting. For example, the ORB 210 allows the Connector Object 150 to connect to the Server Object 240 on the application server 230. Although the application server may be one or a multiple of machines in various locations, the client software need not know where an object resides, so long as the ORB 210 is running. The Connector Object 160 merely requests an object from the ORB 210, and the ORB 210 allows the Connector Object 150 to connect to the requested object. For example, assuming an education based student database management system, the Event Client Object 160 may execute the following request:

GetService (Admissions)

This request would subsequently be sent to the ORB 210, which would then allow the Event Client Object 160 to connect to the Event Servant Object 250, where the class "Admissions" resides. This would then allow an object "admissions" to be created.

Moreover, server objects may be classified as either distributed or non-distributed. Distributed components are capable of being remotely invoked. Thus, a distributed component in an application may communicate with other distributed components, collaborating on the results of operations, transactions, and performing services. Additionally, distributed components proceed a component execution system, allowing communication, load-balancing, monitoring, security, transaction, and persistence services. These services are analyzed in greater detail below.

Figure 4A:
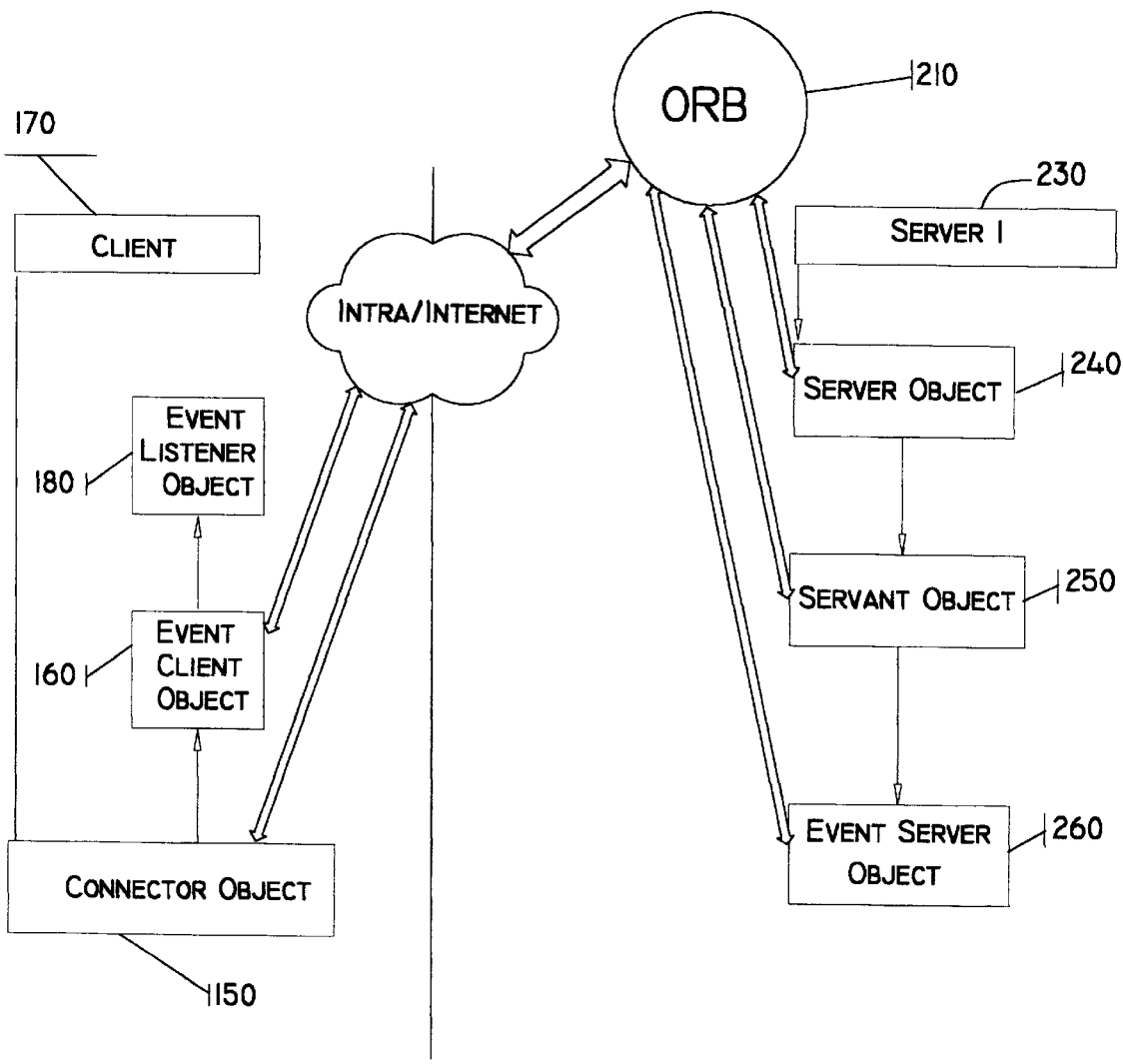
FIG. 4a is a schematic showing the objects used during asynchronous communication.

Referring to FIG. 4a, asynchronous communication between objects preferably is implemented using the Servant Object 250, Connector Object 150, Event Client Object 160, Event Server Object 260, and Event Listener Objects 180. In general, when a client 170 requests a service, a Servant Object 250 is issued to process its requests, and an Event Server Object 260 thread is started. In the Connector Object 150, an Event Client Object 160 thread is preferably started and connects with the Event Server Object 260. The Event Client Object 160 polls the Event Server Object 260 for waiting events and processes them using the Event Listener Object 180. Additionally, the Default Event Listener class provides basic processing of events such as system messages and requests for data from application components. The following details the various objects used in asynchronous communication between objects in accordance with the present invention.

The Connector Object, Event Client Object, and Event Listener Objects

As discussed above, once spawned, the Connector Object 150 creates the Event Client Object 160. The Event Client Object 160 handles service requests, and allows the client 170 to access any services or data. Moreover, when the Event Client Object 160 is created, it creates a Event Listener Object 180. The Event Listener Object 180 connects to the ORB 210 independently of the Connector Object 150.

Servant Object

The Servant Object 250 manages and controls the interaction between the client and the system. Once created, the Servant Object 250 manages and works with the Connector Object 150 to handle all transactions between the two tiers, I and II. All transactions go through the ORB 210 which continues to direct the Connector Object 150 requests to the Servant Object 250 for handling.

The Servant Object 250 is preferably created when the ORB 210 receives a request for a Servant Object. In response to this request, the Server Object 240 creates a Servant Object 250 from its Servant Object class. Once the Servant Object 250 is created, it handles all requests from the client 170 through the Connector Object 150 and the ORB 210. Further, once the Servant Object 250 is created, it creates a Event Server Object 260 for all asynchronous service communication between the Event Client Object 160 and Component Objects 270.

Figure 4B:
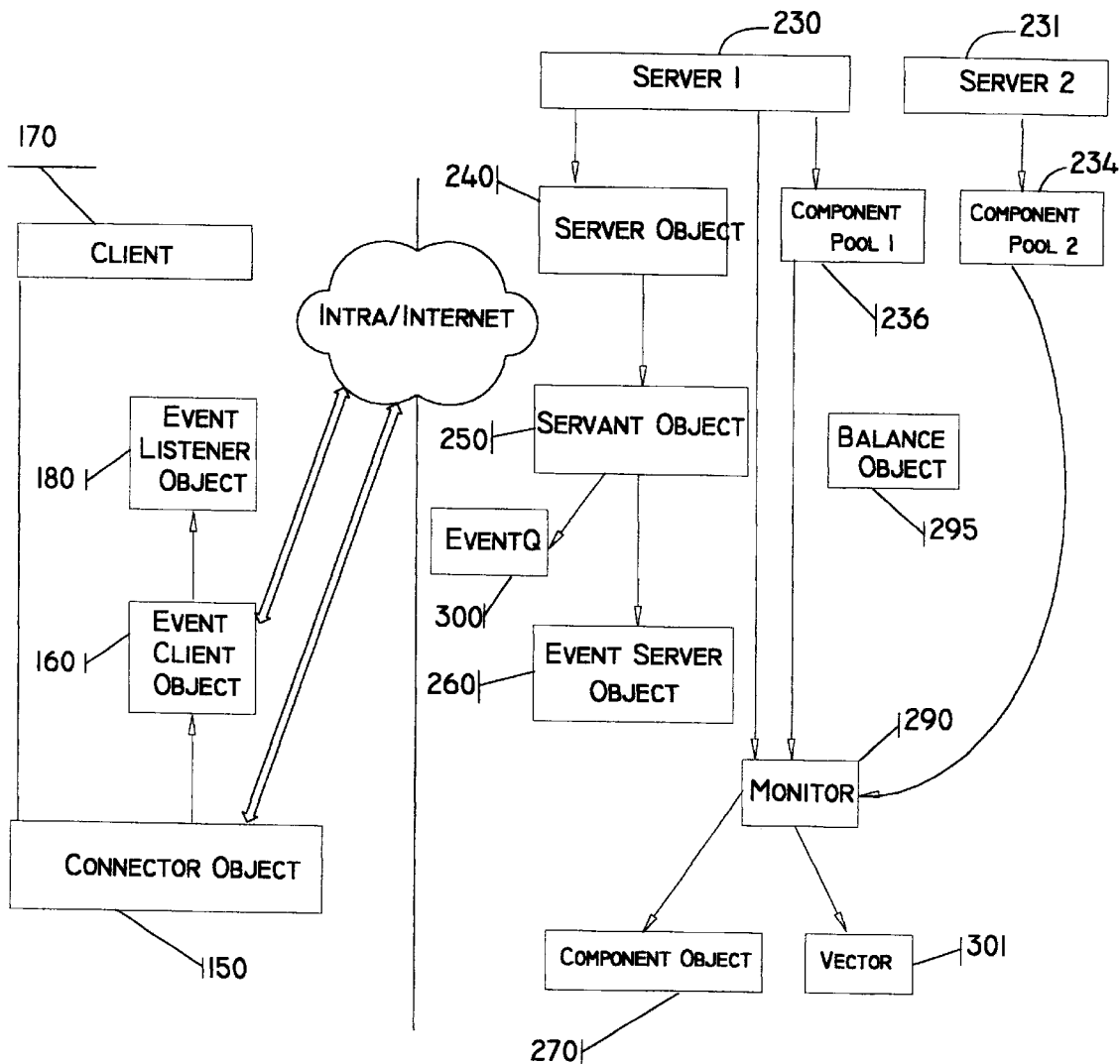
FIG. 4b is a schematic showing the objects used during load balancing.

Referring now to FIG. 4b, load balancing is preferably implemented and managed by the server classes Monitor Object 290 and Balance Object 295. Preferably, Monitor Object 290 keeps track of the number of clients connected and the amount of server side resource each client is using, as well the amount of RAM each client consumes. Monitor Object 290 also preferably keeps track of the client connections, so that if a client loses a connection, Monitor Object 290 may reclaim the resources used by the client. Balance Object 295 preferably keeps track of Component Pool Objects 234, 236 and provides for distribution of application processing across the Component Pools. The following analyzes these objects in detail.

Component Pool Object

The Component Pool object 234, 236 manages resources and reclaims them when the various services from the various Component Objects are finished and no longer active. The various services can be distributed among various servers on the intranet, or across the Internet, maximizing performance and CPU resources.

The Component Pool Objects 234, 236 preferably comprise a table of component objects with references for all of the attributes for each component object. Further, the Component Pool Object 234, 236 is the base class object for all components in the invention. Moreover, the Component Pool object 234, 236 preferably exists on each server in the network on which the application software is installed. Once a Component Pool object is created, it preferably registers with the Balance Object 290, described below.

Balance Object

The purpose of the Balance Object 290 in the present invention is to balance the workload among multiple servers 230, 231. Moreover, the Balance Object 290 preferably allows multiple users to access the system at once. Upon a service request from a client, Balance Object 290 preferably returns the location of an idle machine. Balance Object 290 is aware of each Component Pool Object 234 on each Server 230,231 in the system as compared to conventional load balancing, which essentially issues a query to each idle CPU upon a request from a client.

The interaction of Balance Object 290 with Component Pool Object 234 allows the software to efficiently manage the load balancing across network machines. For example, the Servant Object 250 may issue a request such as "GetAvailPool(x)" to Balance Object 290. Balance Object 290 would then return the most idle Component Pool, for example, Component Pool 234, which would reside on the most idle CPU of a server 231 in the network. Servant Object 250 then calls the referred Component Pool for an instance of the requested service. The Component Pool 234 then creates an instance of a Component Object 270 for use by Servant Object 250. Further, once it is created, the Component Object registers with the Monitor Object 290 (discussed below), and obtains a reference to its Event Server Object 260. The Event Server Object 260 then creates an Event Queue 300 to track the queue of Events for the client, while the Component Object reference is returned to the Event Client Object 260 through the Servant Object 250. Subsequently, the Component Object is connected to the ORB 210, and the client may invoke operations through the Event Client Object 260 on the Component Object 270 directly.

Monitor Object

The purpose of the aforementioned Monitor Object 290 in the present invention is to monitor the processes of each Servant Object 250 and of all of the Servant Object's threads in order to conserve resources and maximize efficiency. In order to accomplish this, preferably the Monitor Object 290 has a vector 301 with every activated and live Servant Object 250 listed. Moreover, every Servant Object on the vector has every component Object 270 existing on the Servant Object 250 referenced in the vector 301. Once a Component Object 270 is finished, the Monitor Object 290 preferably releases resources claimed by the Component Object in order to conserve system resources.

The Monitor Object 290 preferably works in the following way. When a client 170 evokes an operation or transaction, it necessarily changes something in at least one Component Object 270. When a change in a Component Object 270 occurs, the Event Server Object 260 time stamps the Component Object 270 with the time of the last transaction. The Event Client Object 160 polls the Event Server Object for a message indicating that a component is still active. The amount of time between each poll is selectable. The Server Object's Event Queue 300 will report to its Event Server Object a message indicating that a component is still active. If a servant Object 250 is still connected to its originating client and processes are still ongoing, Monitor Object 290 does nothing to the component. However, if a Servant Object 250 reports no action back from its Event Server Object 260, the Monitor Object preferably kills any remaining Component Objects 270, and reclaims any resources that they were using.

Referring now to FIG. 3, the Security Object 310 preferably provides encryption and role-based security interfaces used by the Servant Object to limit access to specific application components and functions. This is based upon entries in OODBMS 40 of FIG. 1 for users, roles, and services. The system includes the ability to define access for specific users or groups of users for specific date ranges. Additionally, Security Object 310 preferably provides for encryption of data between tiers of the system architecture including client to server data exchange.

Transaction tracking is preferably provided in the system of the present invention by a service called Transaction Object 320. Transaction Object 310 provides an interface to application components, called Component Objects 270, for the validation and coordination of events. This includes updates, deletions, and creations of database data in the OODBMS.

Persistence of data in the system of the present invention is preferably provided via the Database Service Object 330. The Database Service Object 330 abstracts query, commit, rollback, and delete operations on the OODBMS. Application components operate on business objects, referred to as Objects 340, which are stored in the OODBMS. The Database Service Object interface is written in terms of these objects.

Non-Distributed components of the preferred system architecture include the inference engine instance, component connections to the OODBMS via the Database Service, business objects described by the object model and implemented as descendants of Object, and Event listeners. These components are not invoked remotely by other objects outside their individual threads of execution.

As shown and preferred in FIGS. 1 and 6, Tier III preferably comprises the Object-Oriented Database Management System 40. (OODBMS). The OODBMS 40 comprises administrative databases, as well as any other databases used by daughter applications residing on top of the application database system architecture framework of the present invention. As shown and preferred in FIGS. 1 and 6, communication between Tier II and Tier III is accomplished through a network. For example, communication may take place through an Ethernet network. Moreover, the OODBMS 40 may be connected to Tier II through an intranet or through the Internet.

For the sake of clarity, the following example will trace through the starting, requesting, and ending of a process with reference to FIGS. 5a–5k.

Figure 5A:
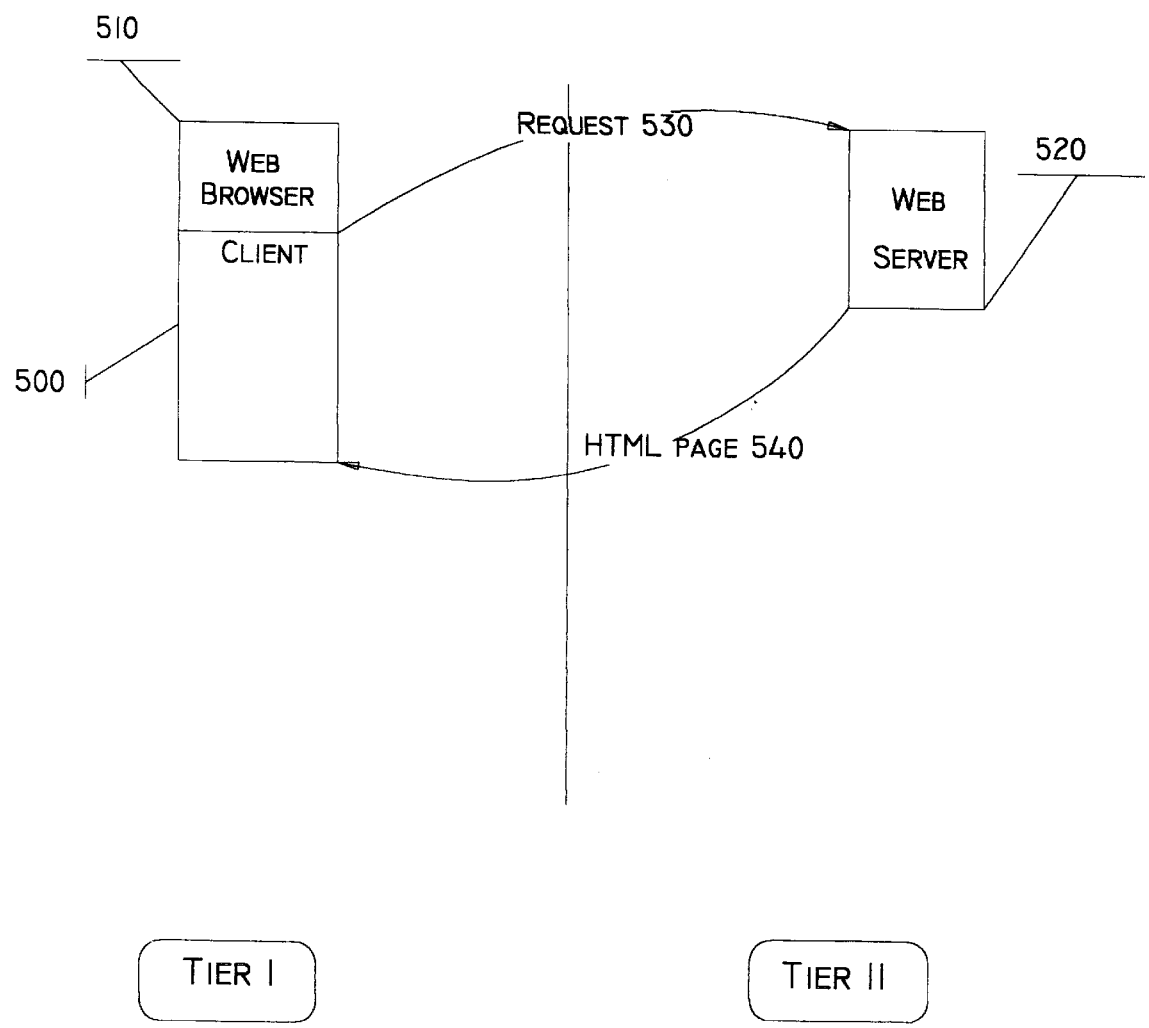
FIG. 5a is a first step in the process of the present invention.
Figure 5B:
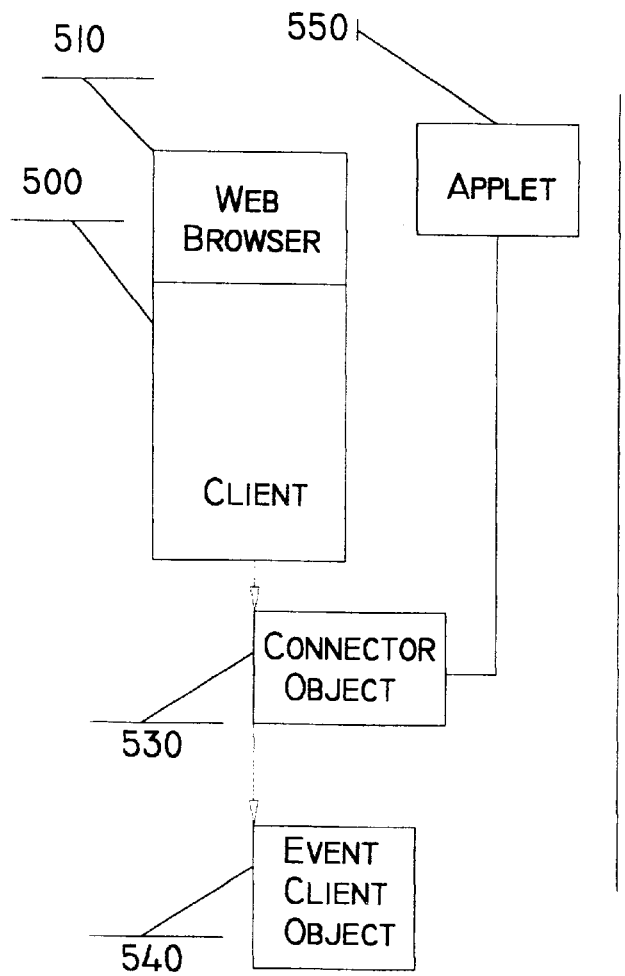
FIG. 5b is a second step in the process of the present invention.
Figure 5C:
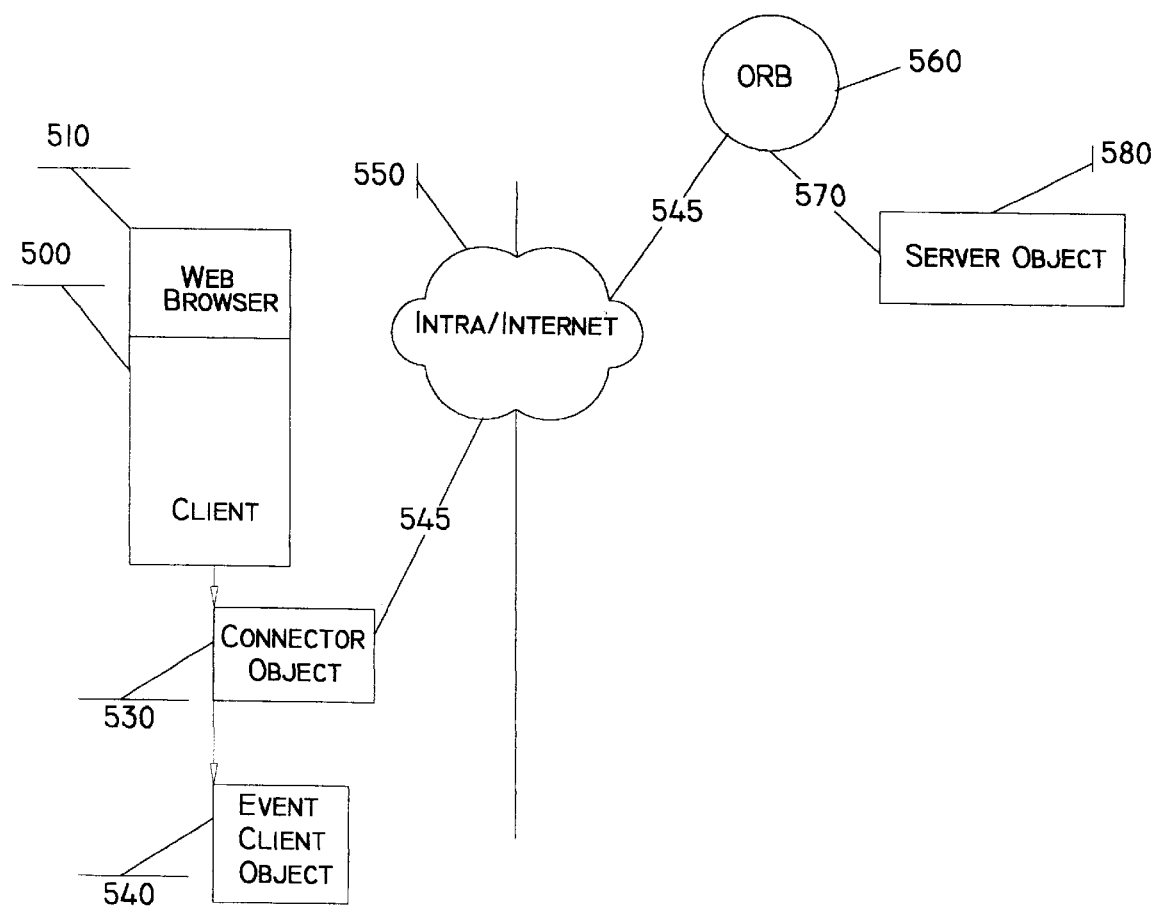
FIG. 5c is a third step in the process of the present invention.
Figure 5D:
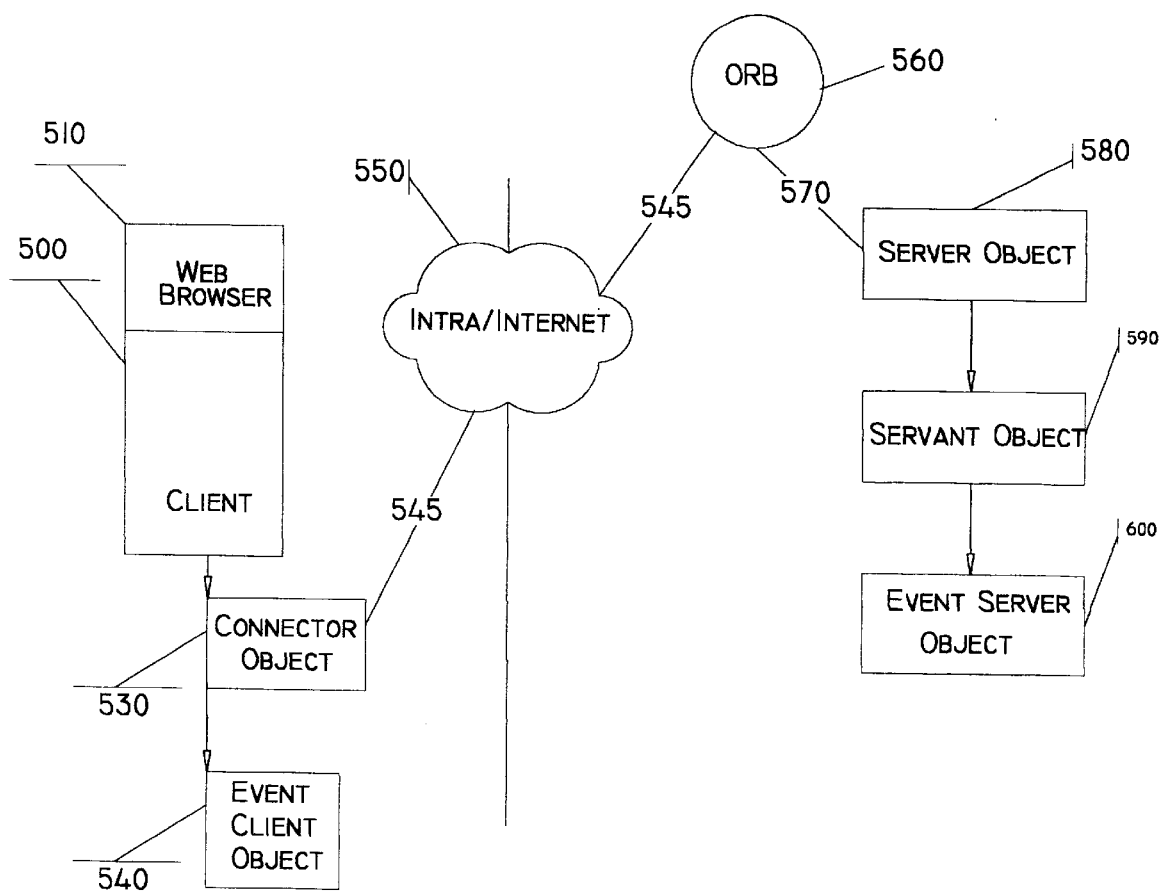
FIG. 5d is a fourth step in the process of the present invention.
Figure 5E:
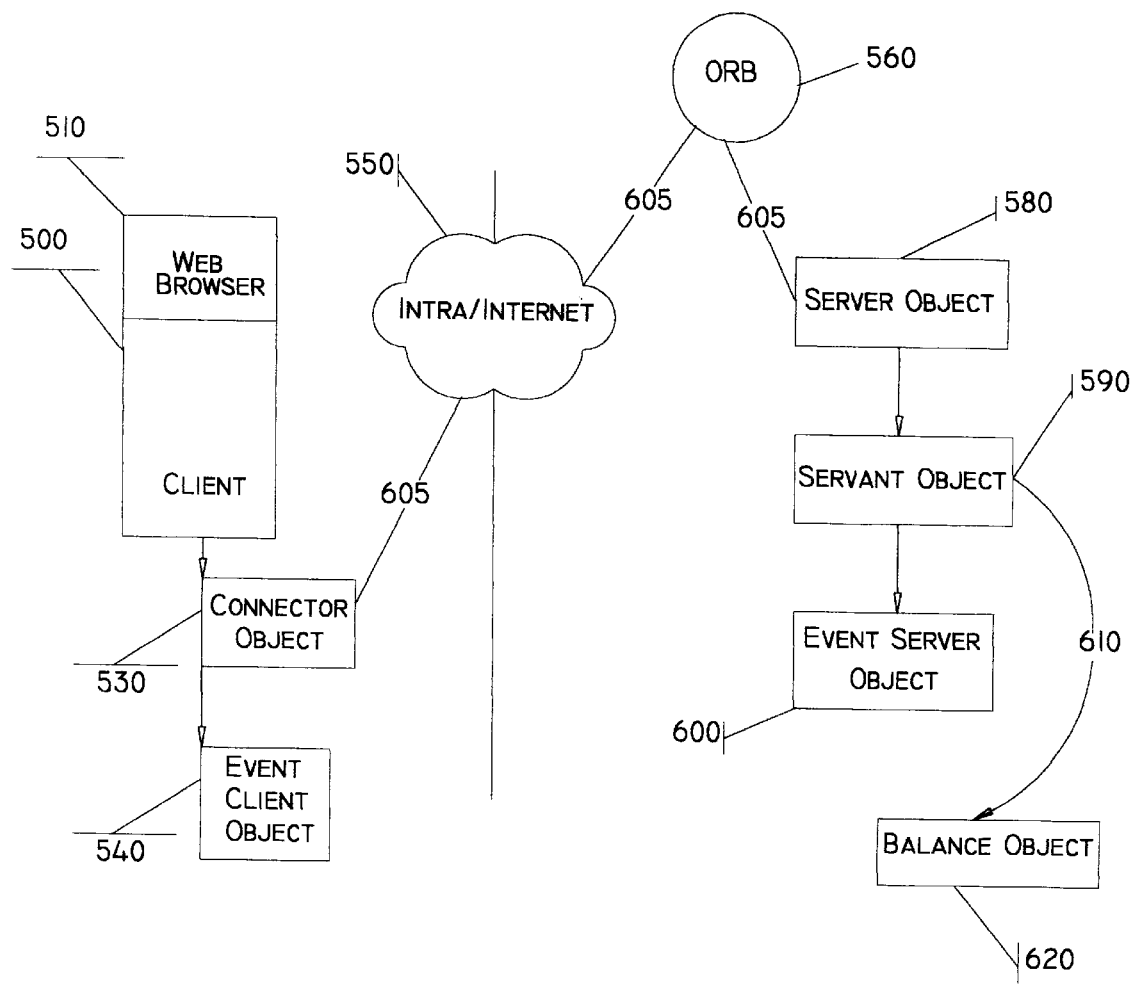
FIG. 5e is a fifth step in the process of the present invention.
Figure 5G:
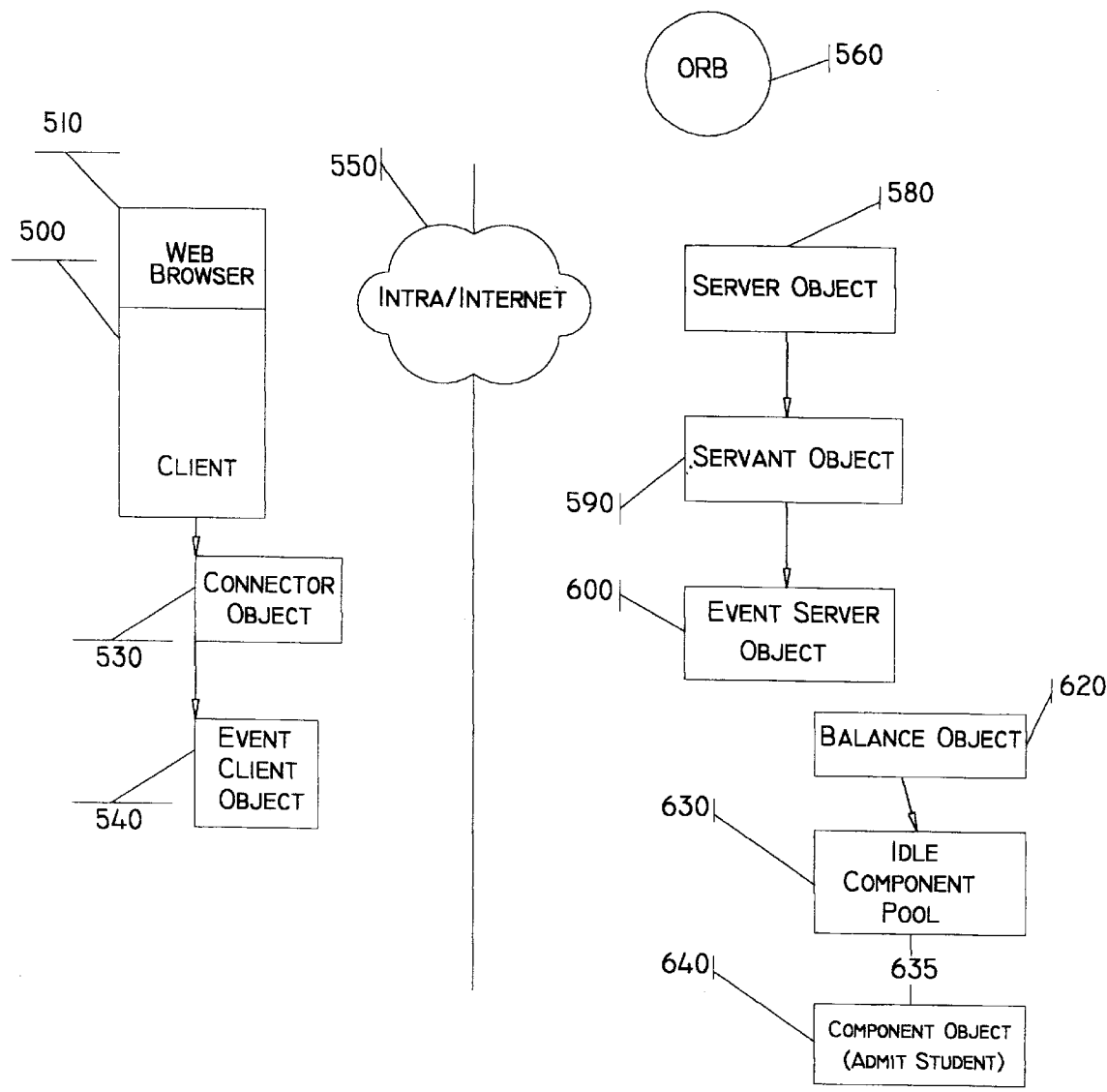
FIG. 5g is a seventh step in the process of the present invention.
Figure 5H:
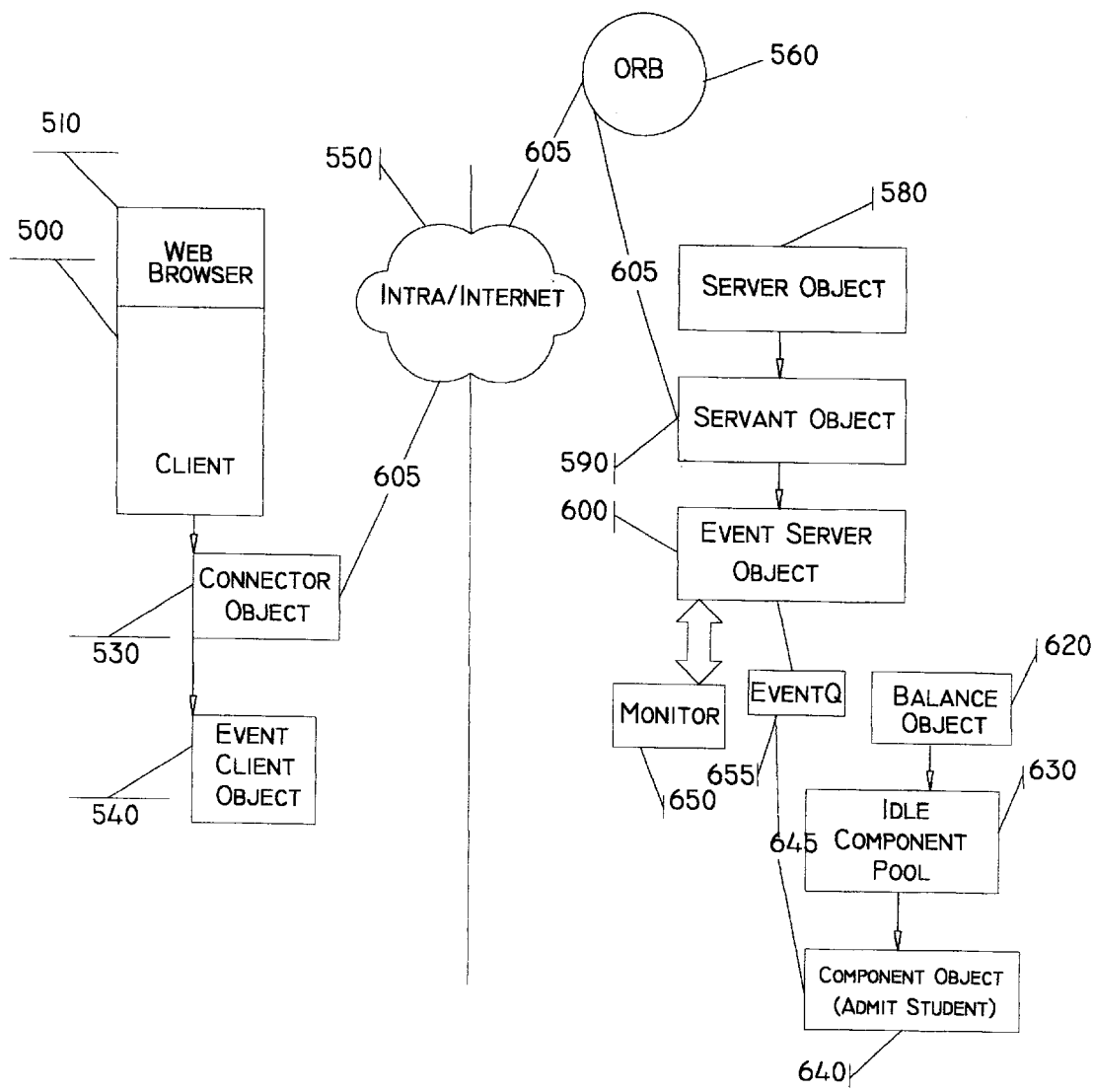
FIG. 5h is an eighth step in the process of the present invention.
Figure 51:
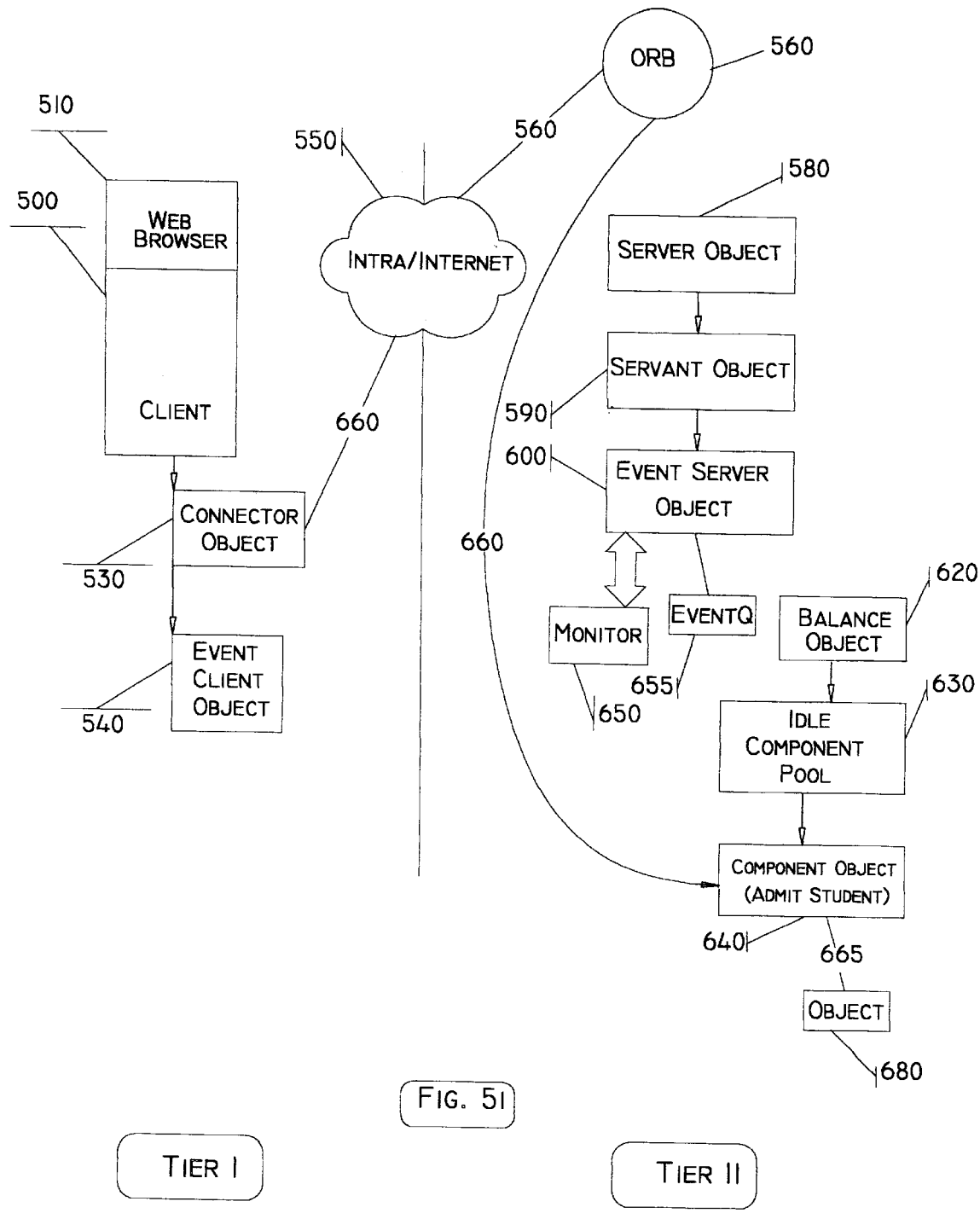

As shown in FIG. 5a, a client 500 running a Java compliant web browser 510 issues a request 530 to a web server 520 for an HTML page. In response, the web server 520 sends an HTML page 540 to the client 500. As shown in FIG. 5b, the Java Applet 550 contained in the HTML page creates a Connector Object 530. In turn, the Connector Object 530 creates an Event Client Object 540. Next, as shown in FIG. 5c, the Connector Object 530 contacts 545 the ORB 560 through the intra/Internet 550. The ORB 560 connects 570 the Connector Object 530 to the Server Object 580. The Server Object 580 then creates a Servant Object 590 to handle all traffic from the client 500 as shown in FIG. 5d. Subsequently, the Servant Object 590 creates a Event Server Object 600 to handle all the client's 500 request for services. The client 500 then chooses a service it wishes to invoke. For illustrative purposes, let us assume the client 500 chooses to invoke the service "ADMIT A STUDENT". The Connector Object 530 then contacts 605 the Servant Object 590 through the intra/Internet 550 and the ORB 560 as shown in FIG. 5e. Subsequently, the Servant Object 590 contacts 610 the Balance Object 620, requesting an idle Component Pool. Next, as shown in FIG. 5f, the Balance Object 620 reports 625 where an idle Component Pool 630 is located to the Servant Object 590. The Servant Object 590 then requests 635 that a specific component (in this example, "ADMIT A STUDENT") be created from the Component Pool 630. As shown in FIG. 5g, the Component Pool 630 then creates 635 a Component Object 640. Moreover, the Component Object 640 receives a reference to its Event Server Object 600. Next, as shown in FIG. 5h, the Component Object 640 registers 645 with the Monitor 650 through the Monitor's Event Server Object 600. The Event Client Object 540 then tells 660 the Component Object 640 what it wants to do (in this case, "Admit Student") as shown in FIG. 5i. Subsequently, the Component Object 640 creates the appropriate Object 680 to complete the transaction. The Component Object 640 then preferably requests the appropriate GUI screen, which is sent to the Event Client Object 540. Based on this GUI, the user inputs information. The Component Object 640 then performs the appropriate functions, such as calling for Rules logic to help it accomplish its task if needed.

Figure 5J:
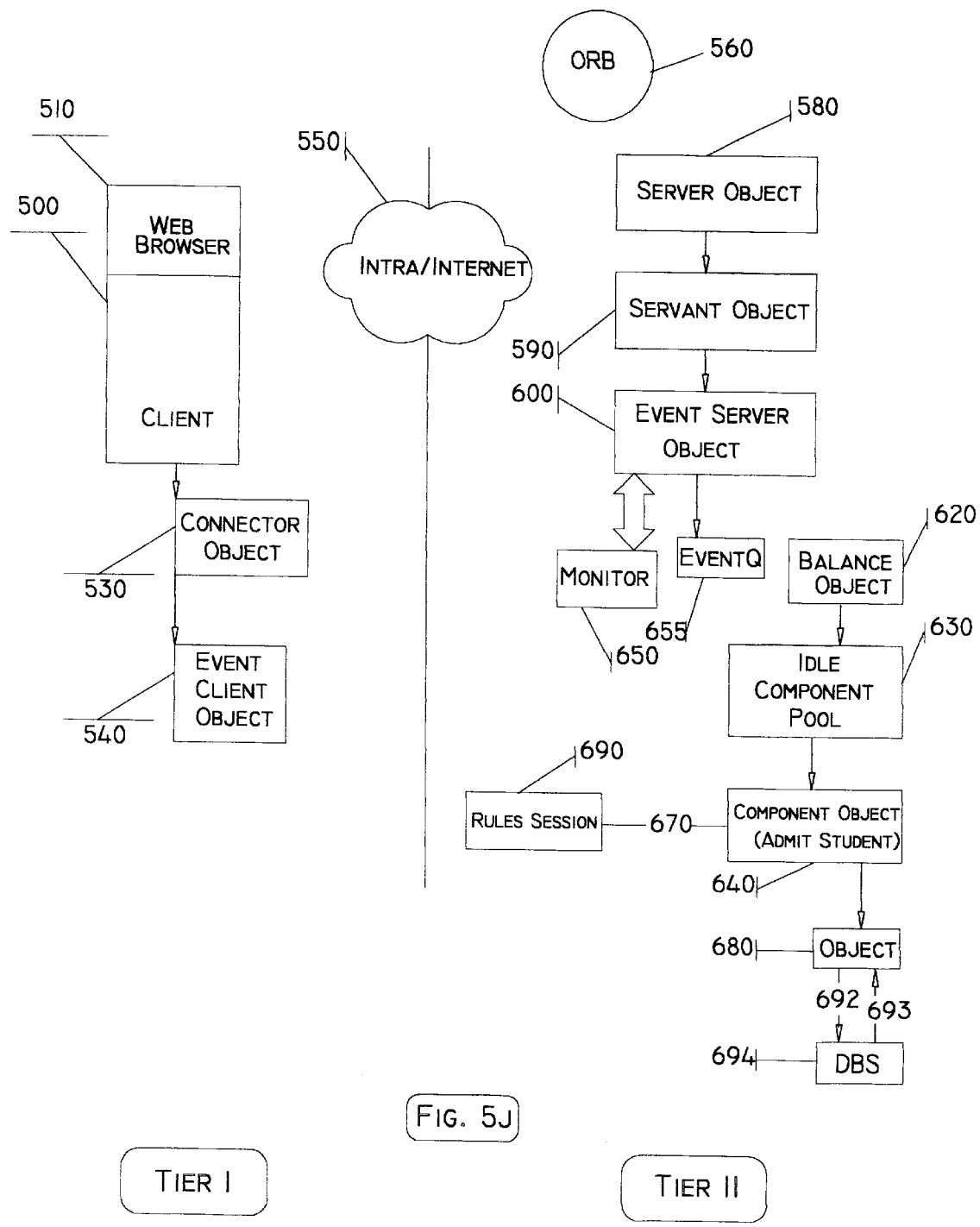
FIG. 5j is a tenth step in the process of the present invention.

As shown and preferred in FIG. 5j, if required, the Component Object 640 creates 670 a Rules Session 690 and pulls the appropriate rules. The Object 680 executes the Rules according to its encapsulated functions. Moreover, the Object 680 may pull 692 or store 693 information from the OODBMS through a Database Service 694.

Figure 5K:
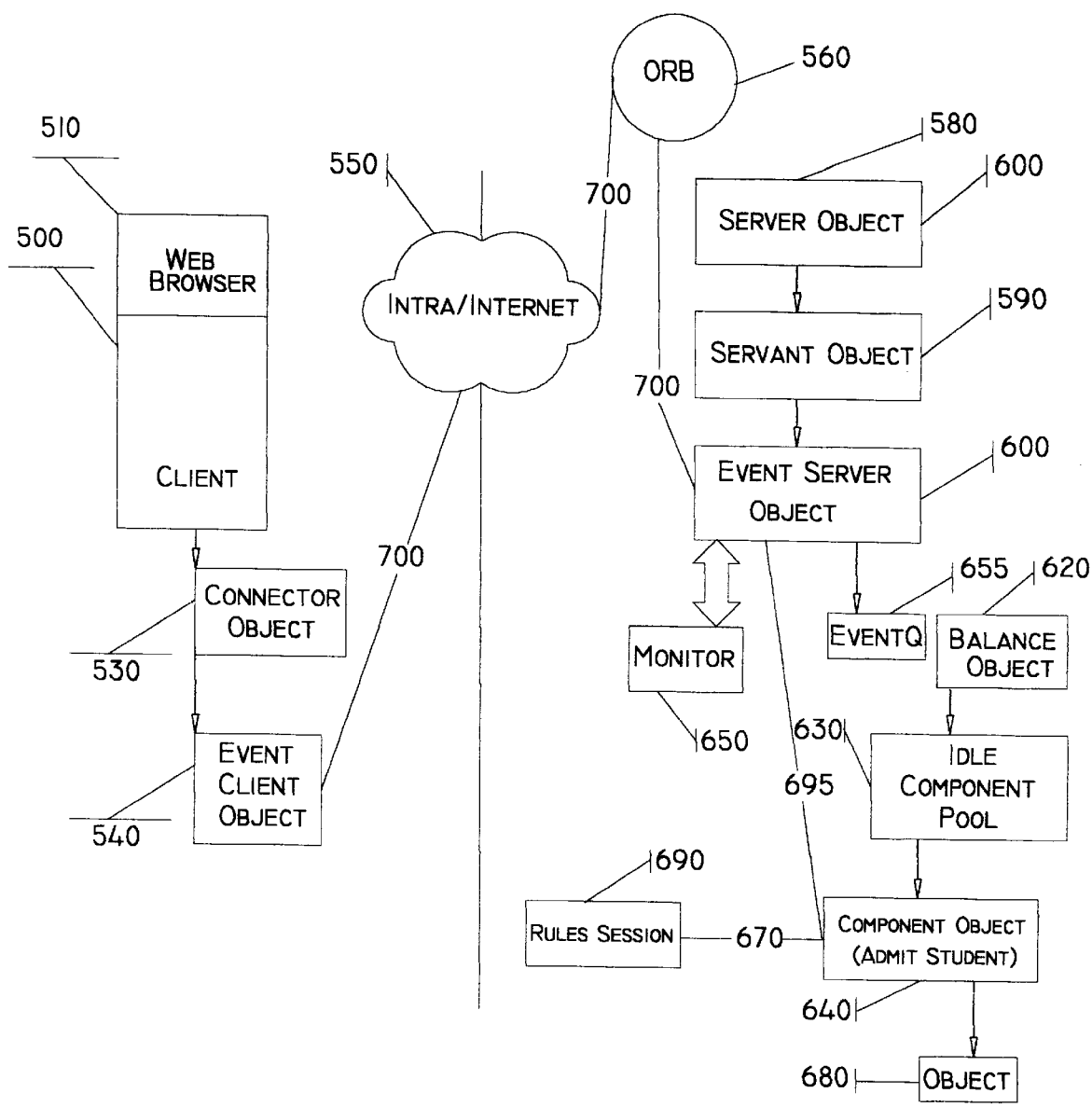
FIG. 5k is an eleventh step in the process of the present invention.

When the Component Object 640 finishes its transaction as shown in FIG. 5k, it is time stamped 695 by the Event Server Object 600. Moreover, the Event Client Object Continues to Poll 700 the Event Server Object 600 to see if there are any active Component Objects 640 in the Event Queue 655. If there are none, the Monitor 650 is notified, and shuts down the components there were activated. The remaining Servant Object 590 is then cleaned up by Java.

Summarizing the operation of the system of the present invention, with reference to FIG. 6, the Client launches browser with JVM and contacts the web server for appropriate HTML page. The HTML page has an applet embedded in the page. The HTML applet instantiates a ZeoConnector object from the ZeoConnector class contained in the applet. The ZeoConnector object knows how to contact the ORB. The ZeoConnector instantiates a ZeoEventClient to handle service requests. The ZeoConnector object contacts the ORB through an intranet or over the Internet. The Internet/intranet represents the beginning of Tier II. The ORB is the third party component that directs traffic for all clients to the appropriate place to find what each client wants. The ORB tells the ZeoConnector where the ZeoServer class is, on the Application Server. The ORB allows the ZeoConnector to connect to the ZeoServer class. The ZeoServer class instantiates a ZeoServant from its ZeoServant class. The ZeoServant will now handle all requests from the client through the ZeoConnector and the ORB. ZeoServer is no longer invoked. When instantiated, the ZeoServant instantiates a ZeoEventServer for all asynchronous service communication between the ZeoEventClient and ZcoComponents. In order for the client to access any services or business objects (data), a ZeoEventClient must be created. The ZeoConnector instantiates a ZeoEventClient object to handle all transactions between the system and the client. ZeoConnector instantiates the ZeoEventClient upon its own creation. When ZeoServant is created for a client by ZeoServer, ZeoServer creates a ZcoEventServer. When ZeoConnector is instantiated, it instantiates a ZeoEvent object, which connects to the ORB independently of the ZeoConnector. The ZeoEventClient object then executes a request for a service on the ZeoServant.

As noted above, there can be many servers in a installation of the invention so that load balancing takes place across all the servers. This maximizes computing power, speed and efficiency. The system also runs on just one server. Any number of clients on Tier I can exist simultaneously, so long as the hardware can handle the connections for each client. Each client can be using the system of the present invention at the same time. Each client has its own thread, from which there are sub-threads for each transaction conducted. The invention automatically load-balances the workload to spread the requests to idle machines. Each server in the network, which is intended to be used by the invention, has to have the system of the present system software installed on it to work. Each server has to run "startPool" to instantiate its Component Pool, which is then available for use. Thus, after the client has contacted the system and a ZeoServant has been created on the Tier II, a ZeoEventClient has been created on Tier I and both communicate with each other through the ORB.

ZeoBalance balances the workload among several servers and allows multi-users to access the system at once. The present invention uses an improved process that allows for more information to be processed than in conventional load-balancing in object-oriented systems. For each new service request from any client, ZeoBalance returns the idle machine, spreading out each instantiation over the available CPUs. This is better than conventional systems because it works on the larger chunks of data. Load-balancing conventionally is done on the query level—each query sent to an idle CPU. This is a holdover from relational databases. Here it is load-balanced on the entire service. This takes greater advantage of the inherent nature of objects as encapsulated packets of data and functions. ZeoBalance knows about each ComponentPool on each server in the system. ZeoBalance is essentially a foreman, making sure all transactions are being completed in the most efficient way. ZeoBalance exists as a permanent object in the system and is not instantiated by anything else.

ComponentPool has a table of component objects with references for all of the attributes for each component object. ComponentPool is the base class object of all components in the present invention. Part of the installed software on each server in the network is a class for creation of an instance of Component Pool. There can be multiple instances of the same ComponentPool on as many servers in the network. The number will equal the number of servers with the invention software installed on it. ComponentPool registers with ZeoBalance when it is instantiated.

ZeoBalance and ComponentPool work together as follows. ZeoServant executes "getAvailPool(x)" on ZeoBalance. ZeoBalance returns the m ost idle ComponentPool (on the most idle CPU of a server on the network). ZeoServant calls the referred ComtponentPool and obtains a component client. ZeoServant asks the ComponentPool for an instance of the requested service. ComponentPool instantiates a component object ("ZeoComponent") for use by the ZeoServant. The ZeoComponent registers with ZeoMonitor when it is instantiated. (Upon instantiation, ComponentPool registers with ZeoBalance; the ZeoComponent registers with ZeoMonitor). The ZeoComponent also obtains a reference to its ZeoEventServer at instantiation. The ZeoEventServer creates an EventQueue to track the queue of ZeoEvents for the client. The ZeoComponent reference is returned to the ZeoEventClient through ZeoServant. ZeoComponent is connected to the ORB. Client invokes operations through the ZeoEventClient on the ZeoComponent directly.

As noted above, ZeoMonitor monitors the processes of each ZeoServant and all of that ZeoServant's threads to conserve resources and maximize efficiency. ZeoMonitor has a vector with every activated and alive ZeoServant listed. Every ZeoServant on the vector has every ZeoComponent existing on the ZeoServant referenced in the vector. Each ZeoComponent is registered with ZeoMonitor upon instantiation. ZeoMonitor essentially tracks client/server heartbeat signals to make sure ZeoServants are still alive and that all the ZeoComponents within the ZeoServant are active. ZeoMonitor c leans up finished ZeoComponents to conserve system resources. This is a new and efficient way to keep the invention from eating up resources and eventually requiring server reboots. Dead (inactive) ZeoServants are automatically culled by Java's garbage collector function.

ZeoMonitor works as follows. When the client evokes an operation or transaction, it necessarily changes something in at least one ZeoComponent. When that happens, the ZeoEventServer time stamps the ZeoComponent with the time of the last transaction. ZeoEventClient polls the ZeoEventServer every X seconds (or whatever period of time is assigned) for NextEvent (from the ZeoEvent class). ZeoEventServer's EventQueue will tell the ZeoEventServer one of three messages: RULERESULT; RULEQUERY; or HEARTBEAT. These three messages are constants in the ZeoEvent class. If there is another event, the EventQueue will notify the ZeoEventServer, who will report the message back to the ZeoMonitor when polled. Even if it is only a heartbeat to tell it that the EventQueue is still working on something, the ZeoMonitor will wait. ZeoMonitor polls each ZeoServant to see when its last timestamp was. If a ZeoServant is still connected to its originating client and processes are ongoing, ZeoMonitor does nothing. If a ZeoServant reports nothing back from its ZeoEventServer, then the ZeoMonitor kills any remaining ZeoComponents. Eventually, the dead ZeoServant is culled by the garbage collection of the Java language.

Components also communicate directly with the ORB regarding any direct communication between it and the ZeoEventClient. ZeoComponent uses the ZeoEventServer to handle asynchronous communications between it and the ZeoEventClient. For example, if the ZeoComponent has a method built in and the ZeoEventClient calls on it to perform directly, the ZeoComponent will perform and report the result to the Client Directly. If, however, ZeoComponent needs more information, it works through ZeoEventServer to handle the communication to the ZeoEventClient. When ZeoEventClient responds with the new data, ZeoEventServer reports it to the ZeoComponent to finish the transaction.

ZeoObjects is the base class for all business objects in the architecture of the present invention.

It should be noted that preferably the knowledge bases are not written in Java but rather in a declarative programming language which is accepted by the particular inference engine used. With respect to the present preferred use of Advisor/J 2.01 from Neuron Data, an example excerpt of a knowledge base in a student database management system is given below:

```
CourseTaughtByInstructor is any CourseSection such
that (it.teacher <>Null).
AnInstructor is any Instructor.
CourseNeedsInstructor is any CourseSection such
that (it.teacher = null).
CoursesTaughtByAnInstructor is any CourseSection
such that (it.teacher = AnInstructor).
rule FacultyLoad_English is if
(CourseTaughtByInstructor.teacher.dept =
"English") then
{
CourseTaughtByInstructor.teacher.teachingLoad =
CourseTaughtByInstructor.teacher.teachingLoad +
CourseTaughtByInstructor.hours * 0.0333, print
("New load calculation:
"CourseTaughtByInstructor.teacher" load is
"CourseTaughtByInsturctor.teacher.teachingLoad)
}
rule FacultyLoad__Math is if
(CourseTaughtByInstructor.teacher.dept = "Math")
then
{
CourseTaughtByInstructor.teacher.teachingLoad =
CourseTaughtByInstructor.teacher.teachingLoad +
CourseTaughtByInsturctor.hours * 0.0250, print
("New load calculation:
"CourseTaughtByInstructor.teacher" load is
"CourseTaughtByInstructor.teacher.teachingLoad)
}
```

As noted above, the present invention is preferably a three-tiered architecture wit clients, on Tier I, accessing the system by starting a web browser with a complaint JVM; accessing the system's homepage via the WWW (World Wide Web); the web browser starts an applet embedded in the HTML document downloaded from the web server running on Tier II; and the applet instantiates a ZeoConnector which then connects the ZeoServer running on Tier II. Once a client instantiates a ZeoConnector, he or she must log into the system by presenting a userid, password, and the particular application suite needed. The ZeoServer instantiates a ZeoServant which will process requests from the user for services. Each client who logs into the system successfully, based upon a database of user definitions administered through the system Administrators, receives its own ZeoServant. The ZeoServant is for all intents and purposes a dedicated "server object" responsible for answering the needs of this particular client. The interface for a ZeoServant is published via CORBA's IDL definition language and the underlying communications protocols established by the ORB implementation. The ORB serves as a "middleman" in all communications between client and server, routing requests for service to the appropriate ZeoServant. The list of services available to a particular client correspond the ZeoComponents which are the basic functional unit of the architecture. ZeoComponent is a base-class from which all components in applications are derived. All share a common parent interface which is implemented at the ZeoComponent level and described in IDL.

The ZeoRemote is a GUI widget which provides for the selection of application services from a list of services validated by the ZeoServant on the basis of the client's userid, password, and "role" as defined via ZeoSecurity. Once a user selects a service, the client accesses the thin-client GUI classes for that particular service by downloading them from the web server. This means that if interfaces have changed, perhaps a new version of the GUI is available, the client always uses the most up-to-date version without the costly MIS overheads associated with managing an install-base of thick-client administrative software. The user interacts with the system via the user interface. Behind each component GUI frame, on the applications server, there exists an instance of a class derived from ZeoComponent.

As discussed above, ComponentPools provide for distributed computing by allowing the ZeoBalance to spread application processing over multiple processes or even servers forming an applications server cluster. Using this strategy, the system architecture can leverage the most of computing power by combining the resources of application server hardware to support more concurrent client connections. ZeoComponents have associated ZeoRulesSessions and manage zero or more business objects which derive from the ZeoObject base class. ZeoObjects are persistent, rules-aware objects over which business rules enforce the policies and practices of an institution using applications based upon the system of the present invention. Business rules are evaluated whenever an operation is invoked upon a ZeoComponent from the client interface. Rules enforce business policy and procedure and are represented in an ASCII format rulebase processed by the inference engine embedded in the ZeoRulesSession. As noted above, the presently preferred embodiment of the present invention uses Neuron Data's Advisor/J 2.0 inference engine and rulebase language. Rules are developed using the Advisor/J Builder IDE and are organized into projects and reside on the application server's secondary storage device. In a student database management system using the present invention, ZeoObject subclasses represent business objects such as "students", "instructors", "payroll transactions", "benefit plans", etc. ZeoObjects are persistent and are stored in the ODBMS using the system DatabaseService class which is part of ZeoPersistence. An example of a business rule assuming a payroll system, which illustrates the rulebase syntax and purpose of the rule is:

```
APayroll is any PayrollObject.
rule        CalculateDollarAdjustment R1 is
if          InvalidPayroll.Value = false and
            Apayroll.earningTrans = "Regular"
then
{           Apayroll.dollarAdj =    Apayroll.hours *
                                    FedConstants.minWage,
            print   ("Your dollar adjustment has been
                    calculated based upon minimum wage
                    as "Apayroll.dollarAdj)
}
```

Rules are triggered through user initiation of a component transaction. Rules are enforced by the ZeoRulesSession's inference engine and operate over native Java objects. The inference engine includes both forward-chaining and backward-chaining support through its inference algorithm.

Rules are stated atomically in terms of the business rule they represent and are evaluated based upon the data provided to the engine and the conditions of the rule(s). This approach separates the business logic of an application from the process logic. It enables changes to the rulebase reflecting changes in business policy or procedure without forcing the system to be taken offline and are centrally managed.

As opposed to making changes to SQL queries in an RDBMS-driven system or modifying and then recompiling, code written in COBOL, this strategy isolates changes in policy or procedure from the source-code level implementation of services such as distributed communication, persistence, GUI interaction, etc.

Business rules allow customization by resting on a solid Core Object Model and isolating the details of "how" from the business-oriented concerns of "what", "when", "why," and "how much?" Instead of forcing a client institution to adapt its policies and procedures to match a new system, the system of the present invention allows the system to adapt to the client institution. Rules are partitioned based upon functional area and allow customization for individual institutions without re-implementation of the entire system. In order to provide maximum flexibility for the development of software in accordance with the present invention intended for educational institutions ranging from small to large with varying requirements, practices, etc. code generators may be employed to provide much of the implementation for applications making maximum use of the system framework. Code generators provide for great savings in application development time and allow a small team of developers to create large and complex distributed systems quickly, consistently, and coherently. The code generation process may make use of metadata descriptions of application data, GUI, and functionality. From this metadata, code generation can produce the base files necessary for the implementation of the entire 3-tiered application. Customization and implementation can then proceed extremely quickly. Regeneration preserves customized code and implementation work and allows the redesign of GUI screens, and the addition/deletion of data elements to continue without redesigning or reimplementing the entire system.

What is claimed is:

1. A method for retrieving and storing information using a multi-threaded application development framework, wherein said method comprises a first through fourteenth step, wherein:

said first step comprises sending a request for an HTML web page from a client running a web browser application, to a web server application, wherein said web server application sends said HTML web page in response to said request, said HTML page comprising an object-oriented applet;

said second step comprises said web browser receiving said HTML page and launching said object-oriented applet, said applet creating a connector object, and wherein said connector object creates an event client object;

said third step comprises said connector object contacting an Object Request Broker (ORB) through a first network, and wherein the ORB in response connects said connector object to a server object;

said fourth step comprises said server object creating a servant object, said servant object for receiving information from said client, said servant object creating an event server object, said event server object receiving service requests from said client;

said fifth step comprises said client selecting a service to invoke;

said sixth step comprising said connector object contacting said servant object through said first network and said ORB, wherein in response said server object requests an idle component pool from a balance object;

said seventh step comprises said balance object reporting to said servant object the location of said idle component pool, said servant object further requesting that a component be created from a component pool;

said eighth step comprises said component pool creating a component object, wherein said component object receives a reference to said event server object;

said ninth step comprises said component object registering with a monitor through said event server object;

said tenth step comprises said event client object communicating to said component object said service to invoke, wherein in response, said component object creates an object to complete said service, said eleventh step comprises said component object requesting a graphical user interface (GUI) screen, said component object transmitting said GUI screen to said event client object, wherein a user inputs information into said event client object through said GUI, said component object performing an action based on said input;

said twelfth comprises said component object determining whether rule logic is required to complete said action, and when said component object determines that rule logic is required to complete said action, said component object creating a rule session and receiving said required rule logic from said rule session;

said thirteenth step comprises said component object determining whether information of a database service should be accessed, said component object transmitting information to said database service when said component object determines that information should be sent to said database service, said component object requesting information when said component object determines that information is required, and;

said fourteenth step comprises said event server object time stamping said component object.

2. The method of claim 1, wherein said event client object continuously pools said event server object in order to determine whether any component objects are active.

3. The method of claim 2, wherein when said even client determines that a component object is not active, said monitor is notified and said monitor shuts down said component.

* * * * *